Aug. 6, 1957  N. C. ARTSAY  2,802,114
METHOD AND APPARATUS FOR THE GENERATION OF POWER
Filed June 15, 1955  11 Sheets-Sheet 1

Inventor
NICHOLAS C. ARTSAY
By
C. R. Miranda
Attorney

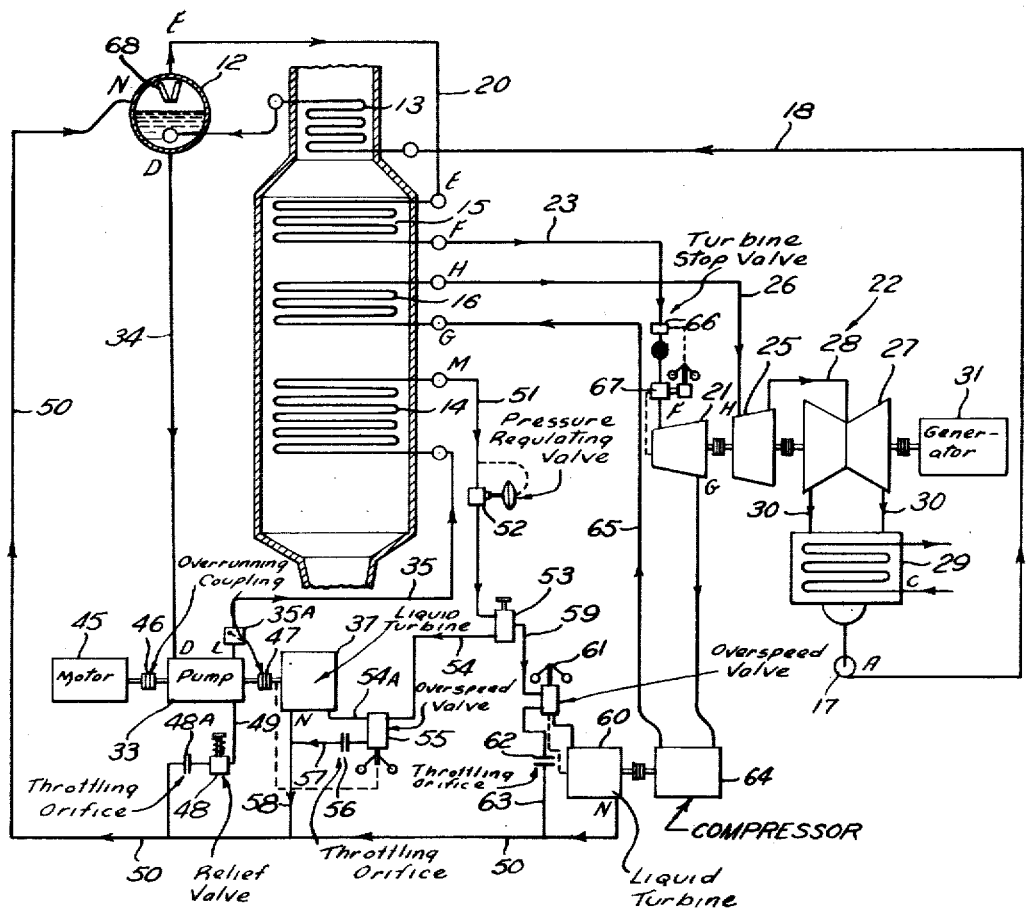

INVENTOR.
NICHOLAS C. ARTSAY
BY
C. R. Miranda
ATTORNEY

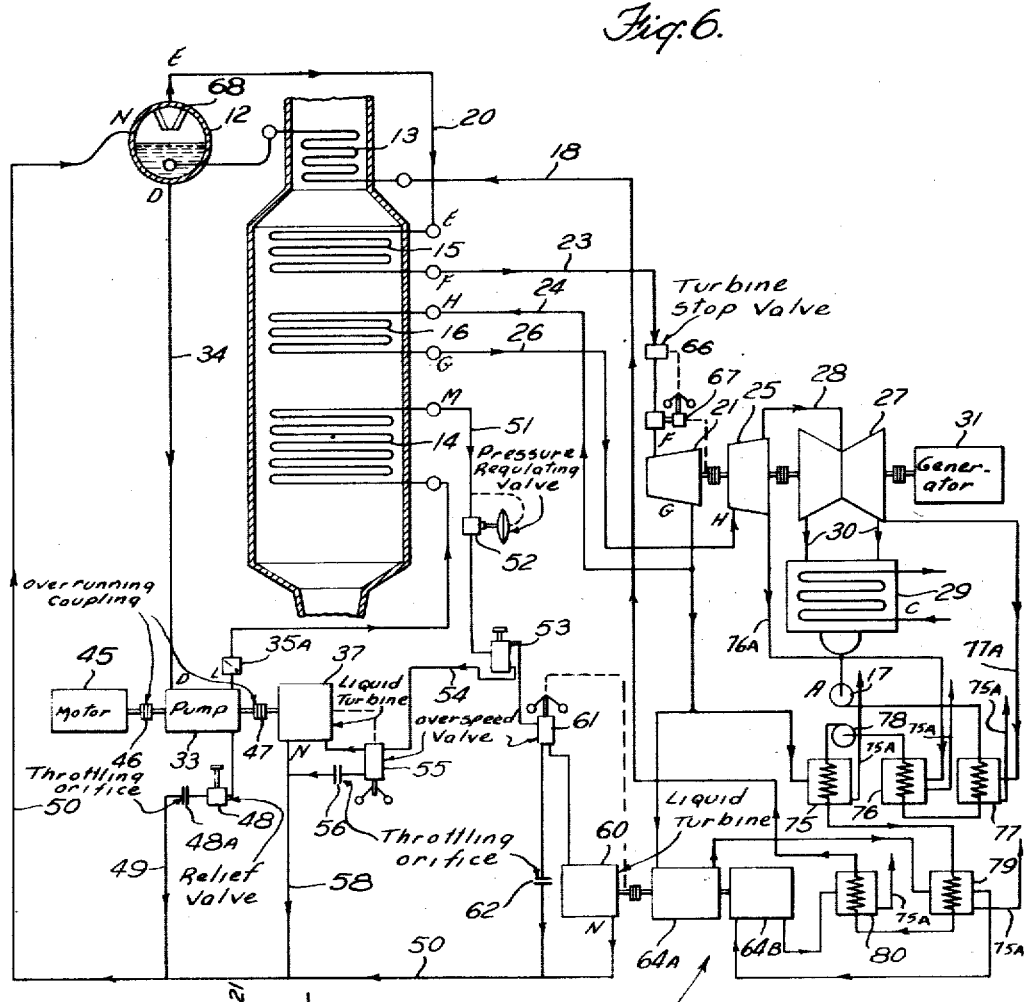

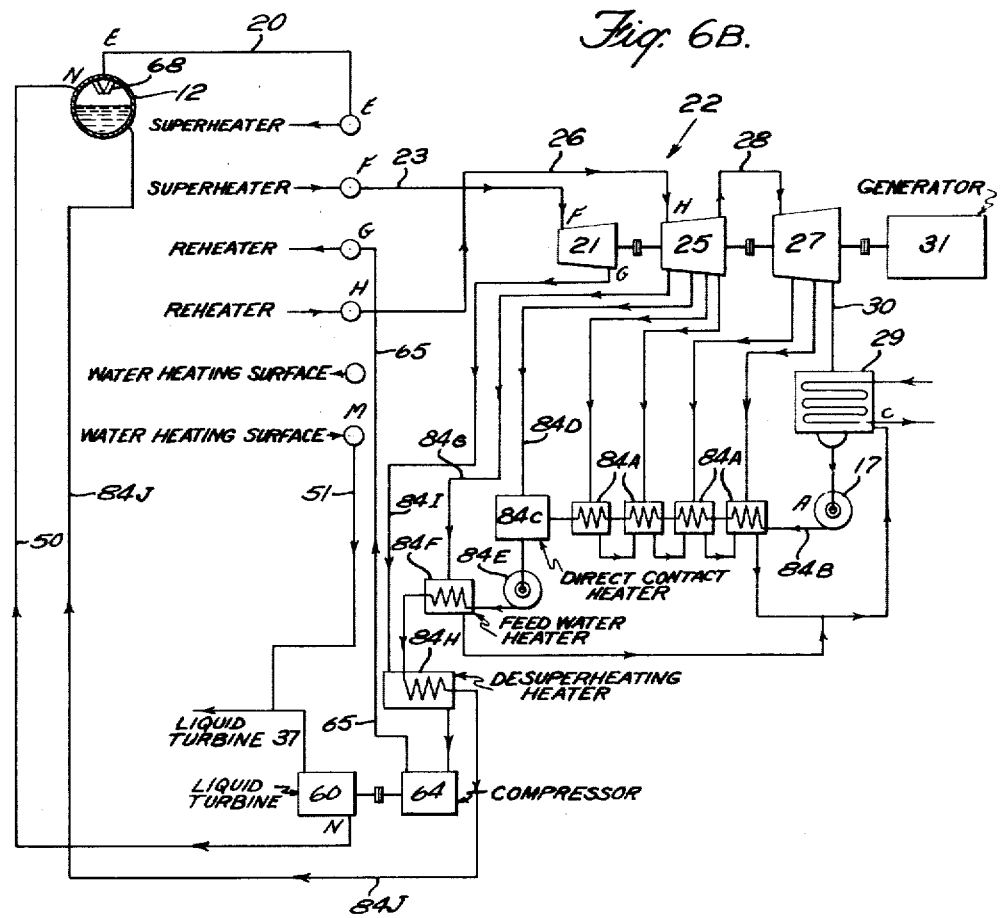

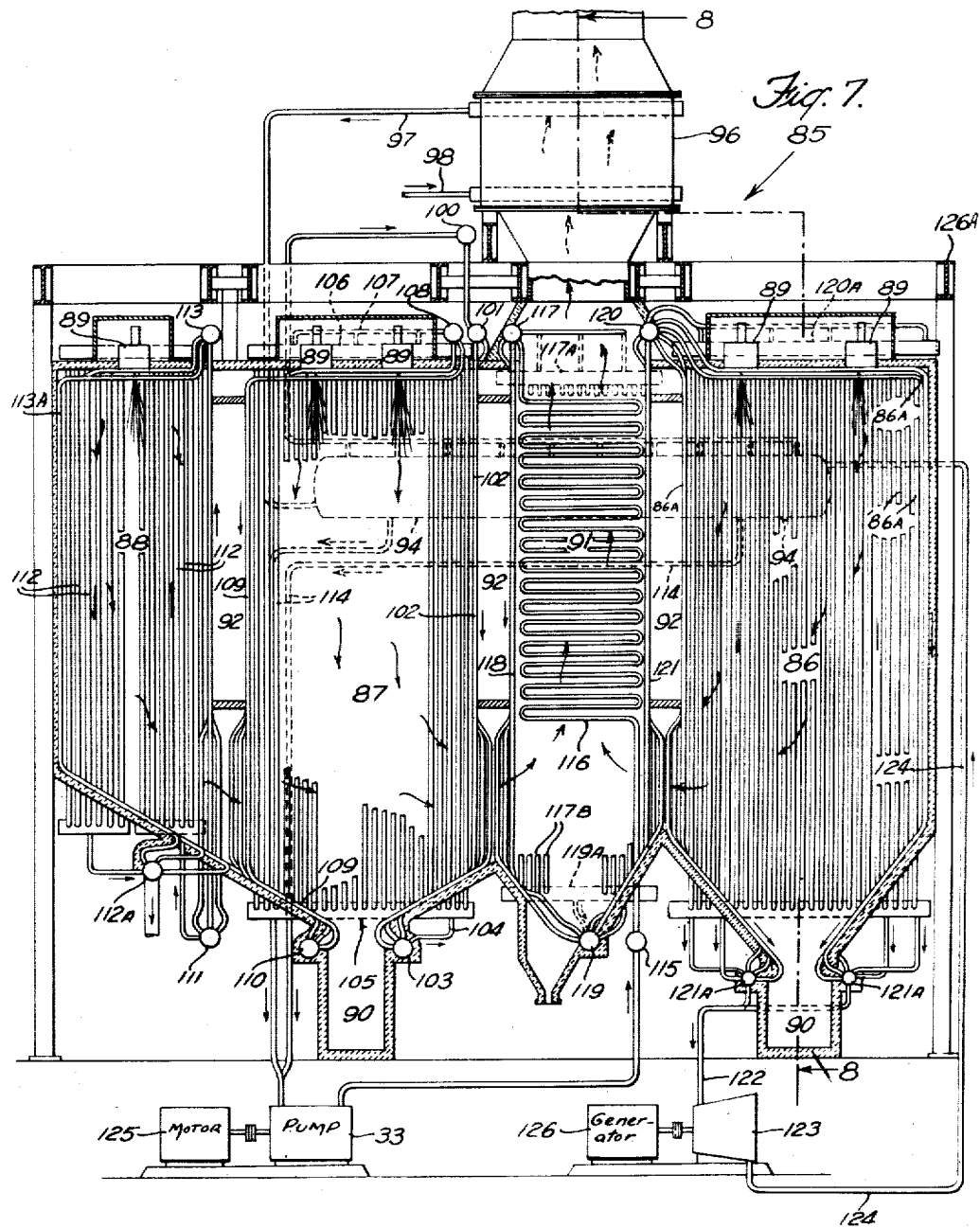

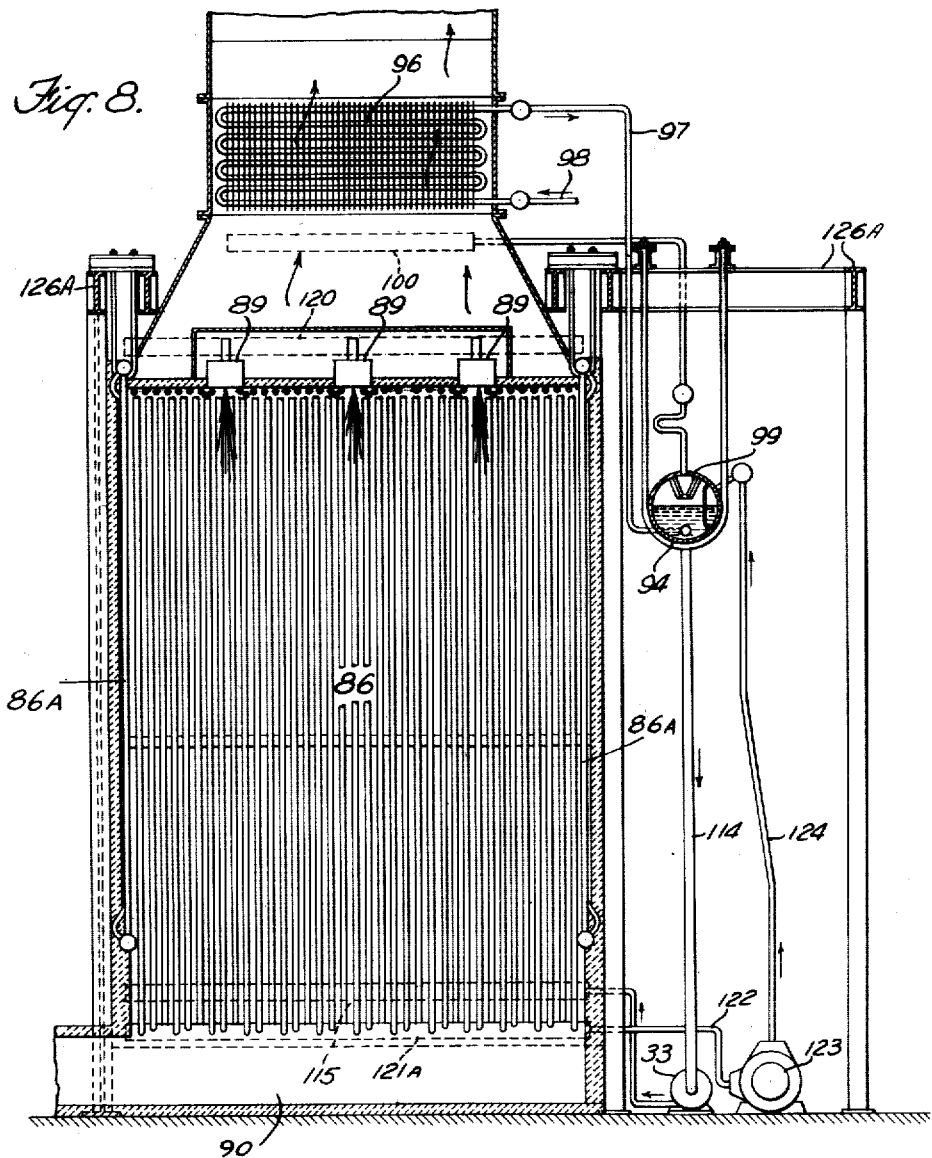

Aug. 6, 1957  N. C. ARTSAY  2,802,114
METHOD AND APPARATUS FOR THE GENERATION OF POWER
Filed June 15, 1955  11 Sheets-Sheet 9

Inventor
NICHOLAS C. ARTSAY
C. K. Miranda
Attorney

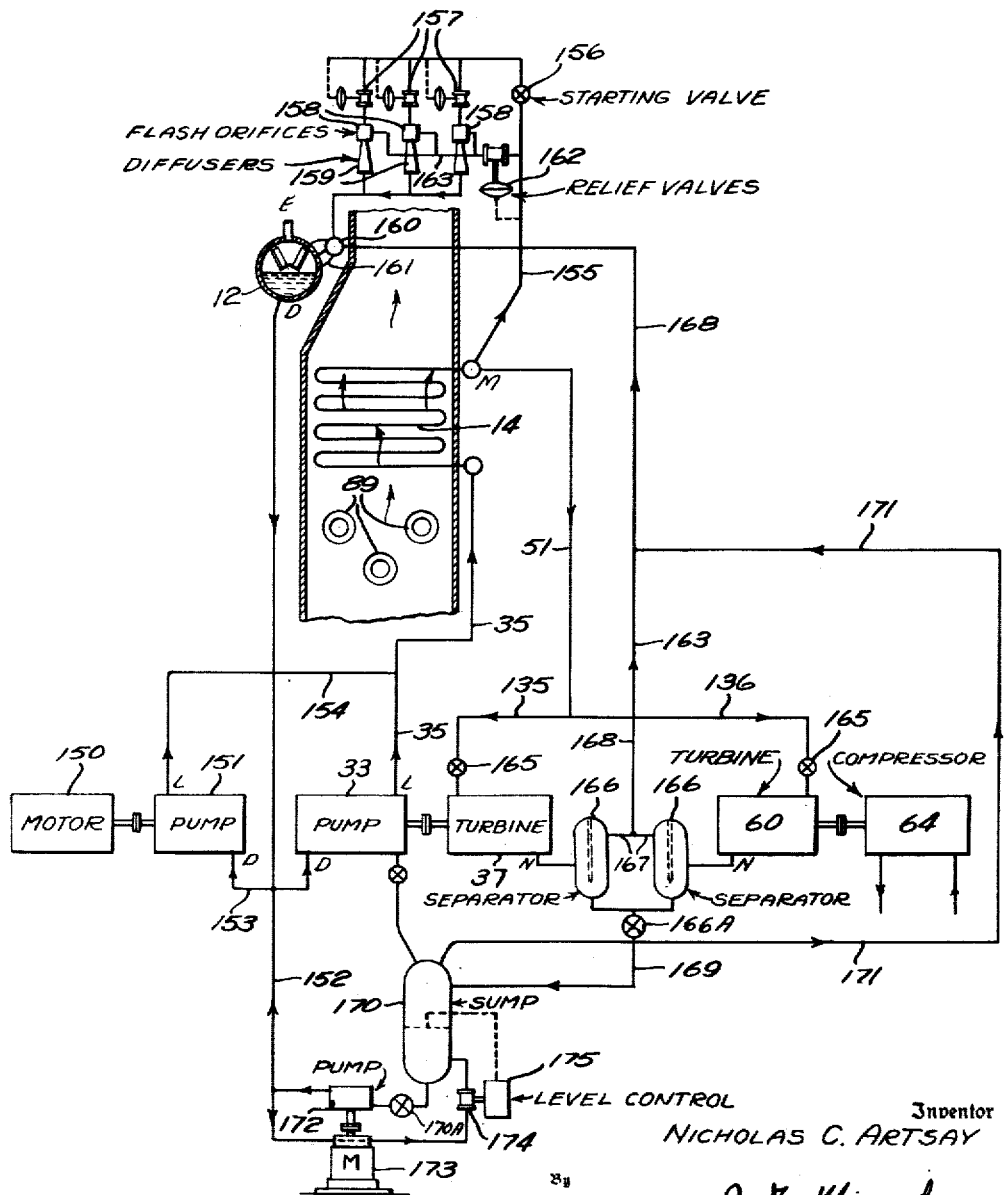

Aug. 6, 1957 N. C. ARTSAY 2,802,114
METHOD AND APPARATUS FOR THE GENERATION OF POWER
Filed June 15, 1955 11 Sheets-Sheet 11
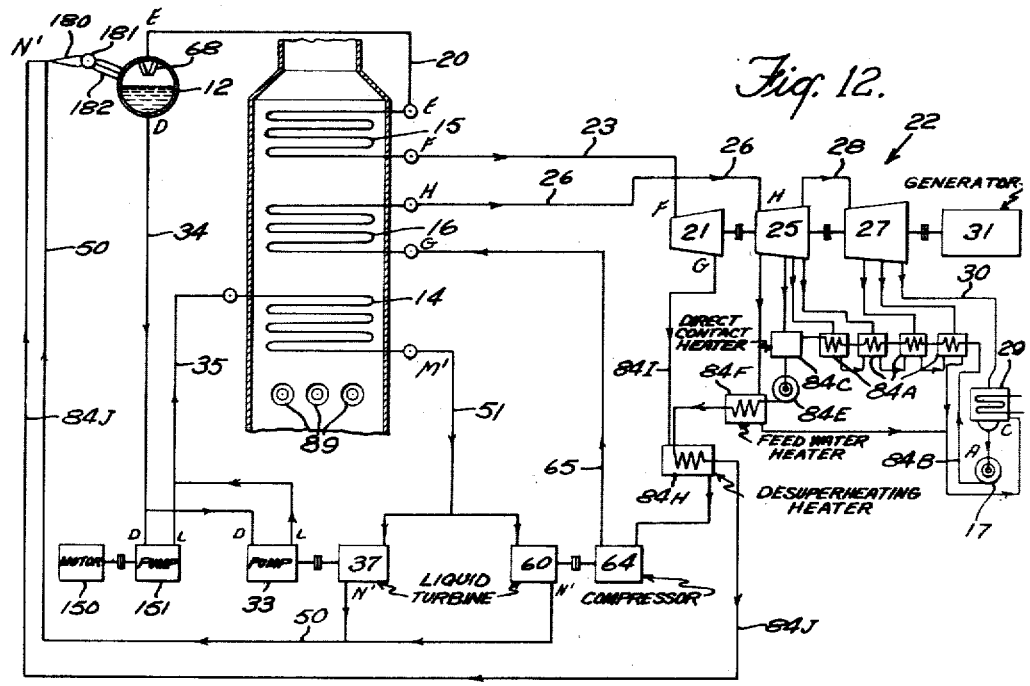
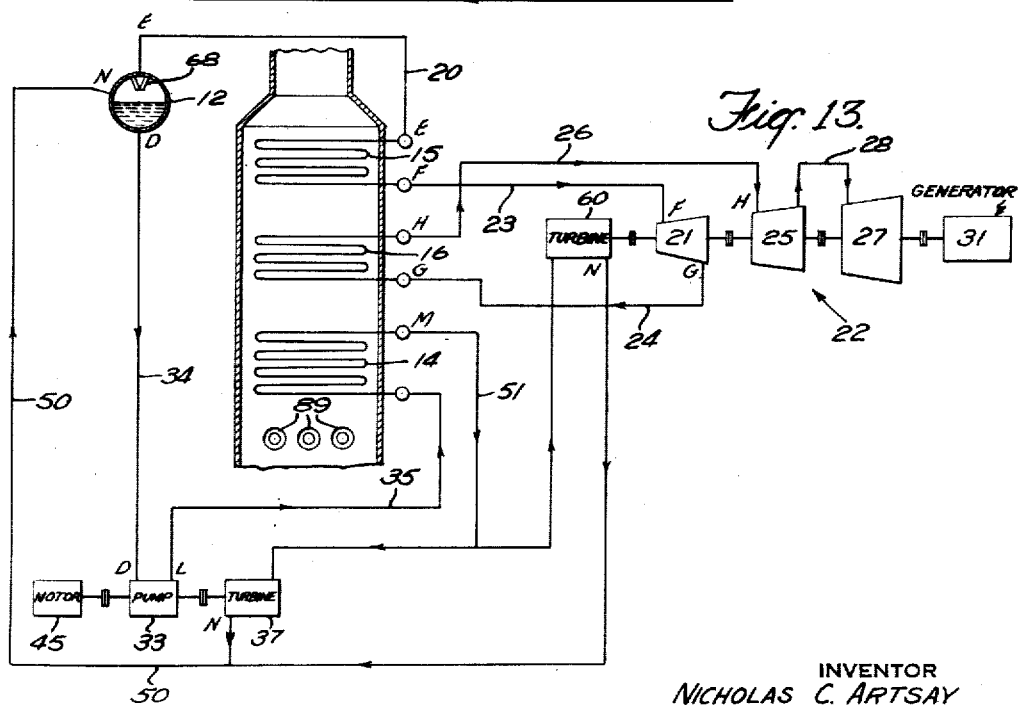
INVENTOR
NICHOLAS C. ARTSAY
BY
C. R. Miranda
ATTORNEY

United States Patent Office

2,802,114
Patented Aug. 6, 1957

2,802,114

METHOD AND APPARATUS FOR THE GENERATION OF POWER

Nicholas C. Artsay, Valhalla, N. Y., assignor to Foster Wheeler Corporation, New York, N. Y., a corporation of New York Application June 15, 1955, Serial No. 515,729

55 Claims. (Cl. 290—2)

This invention relates to power generation and more particularly to method and apparatus for producing a power cycle of high efficiency.

This application is a continuation-in-part of applicant's pending application Serial No. 378,891, filed September 8, 1953, and now abandoned.

It is well known that the efficiency of a steam power cycle is increased by raising the pressure and temperature of the steam. Attempts have been made to increase the pressure above the critical value but these attempts have been unsuccessful for a number of reasons. One difficulty is that it is impossible to eliminate impurities and contaminants brought in with the feed water because water in the system, when above critical pressure, does not change its state. Accordingly, when the pressure of the water is reduced by expansion in a turbine to steam, the steam carries along the impurities and the latter deposit in the turbine to cause fouling of the blading. It has been found also that satisfactory control of rate of feed water in the proposed above-critical pressure systems to control steam temperature at varying loads is extremely difficult to obtain. Furthermore, the high pressure and temperatures require greater thickness of metal parts until a limit is reached where it is economically infeasible and excessive thermal stresses are encountered.

The present invention has for an object the provision of a power cycle of high efficiency which is obtained by a novel method and apparatus.

The present invention contemplates a method and apparatus by which a steam power cycle is divided into two parallel pressure stages or cycles, a conventional high pressure cycle and an above critical pressure cycle. The water is brought to above critical pressure in the last mentioned cycle and thereafter is reduced to below critical pressure before being introduced in the conventional high pressure cycle.

The invention will be understood from the following description when considered in connection with the accompanying drawings in which:

Figs. 3, 4, 5, 6, 6A and 6B are several embodiments of the apparatus of the present invention;

Fig. 7 is a front elevational view, diagrammatically illustrated of a steam generator for the apparatus of the present invention;

Fig. 8 is a sectional view taken along line 8—8 of Fig. 7.

Fig. 11 is a schematic representation of an arrangement similar to that shown in Fig. 9 but which incorporates means providing for the start-up of the system and prevention of water hammer in conduits communicating the liquid turbine exhaust with the vapor and liquid vessel;

Fig. 12 is a schematic representation of a system similar to Fig. 3 and Fig. 6B but differs in operation from the latter in that fluid from the exhaust of the liquid turbines is substantially dry superheated steam rather than wet steam; and Fig. 13 is a schematic representation of a system similar to those shown in Figs. 3 and 6B but differs in the positioning of the second liquid turbine on the shaft of the steam turbine.

Figure 1:
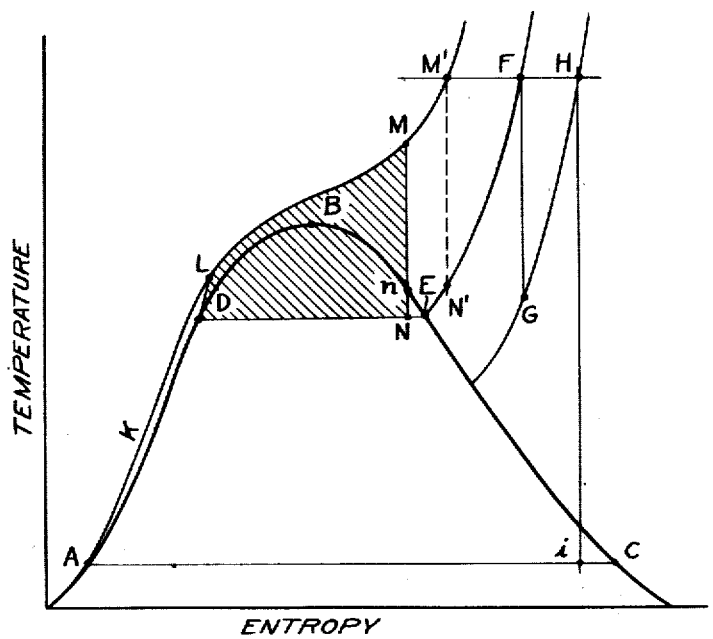
Fig. 1 is an entropy-temperature chart showing the steam power cycle of the present invention.

In order to better understand the present invention a conventional steam power cycle, a proposed above critical pressure steam power cycle, and the above critical pressure steam power cycle of the present invention, will be traced on the entropy-temperature chart of Fig. 1.

Referring now to Fig. 1 a conventional cycle, omitting regenerative feed water heating, may be traced as follows: Water is taken from a condenser at CA compressed and pumped into the boiler as a compressed liquid and heated along line AD to a saturation temperature at point D. The liquid is then evaporated in the boiler along line DE to a dry saturated steam state at point E, then heated along line EF to a superheated steam temperature at point F, expanded in a turbine to a lower pressure along line FG to point G, reheated at constant pressure along line GH to a higher temperature at point H, and expanded along line H*i* to final exhaust pressure at point *i* after which steam is condensed back to A and the cycle is repeated. The area defined by ADEFGH*i*A represents the work done by the cycle.

In heretofore proposed above critical pressure cycles the condensate is taken to point A, raised to a pressure higher than critical and then heated along the curve AKLM' to the point M', then expanded in the cycle along broken line M'N' to a condition N' above the liquid vapor line ABC, reheated along line N'F at constant pressure to temperature F, expanded along line FG to point G, reheated at constant pressure to point H on line GH, and finally expanded to condenser pressure along line H*i* to point *i* and the cycle is repeated after condensation to A. A gain of work over the conventional cycle will be represented approximately by the area DLM'N'ND in which the additional heat will generate an equivalent amount of power.

The above increase in power has not been realized up to the present time because all the impure solids dissolved in the one phase liquid above critical pressure have to pass through the power generator, such as a turbine, with resulting deposits on the turbine blading as the liquid expands below critical pressure to a vapor. Also, close control of the final liquid (steam) temperature is difficult because it is necessary at the same time to regulate feed with respect to the combustion rate to maintain the pressure above the critical value.

The cycle of the present invention on the entropy-temperature chart begins at point A where condensate from the condenser is raised to a higher pressure and heated along line AD to its saturation temperature, point D. The saturated liquid at point D is then raised to a pressure above the critical value, as for example 5,000 p. s. i. along line DL and then heated along line LM to a point M. It is then expanded along line MN, performing work, to a saturation state at point N.

The solids dissolved in the initial liquid continue to be dissolved upon heating of the pressurized water above the critical value, that is upon heating between points LM, and the other impurities therein will either be dissolved or suspended in the form of dry dust, or in a colloidal state. This expansion or reduction of pressure along line MN to the saturated state at point N brings the resultant steam to a condition below the critical value of undercooling for the contaminated steam. The stabilization of non-stable undercooled steam to provide a mixed phase proceeds around nuclei, that is around dissolved and suspended impurities, and the fog so produced will contain most of the contaminants. Thereafter, the problem of removing the fog and its contaminants is done by conventional steam drying methods.

The passage of superheated contaminated liquid through a liquid phase apparatus, as for example a water turbine, does not cause erosion or deposit of scale thereupon because of the high dispersion and the absence of any change of phase in most of the stages except the last one or two. In these last stages the saturation temperature will be high enough with a suitable drum pressure to preclude scaling in the turbine.

The heating of liquid in a state above the critical pressure between points L and M increases its energy so that net energy or power becomes available which is not present in the conventional steam power cycle nor readily obtainable with above critical pressure cycles heretofore proposed.

In the proposed cycles the impurities contained in the liquid state could not be removed, thereby making practical use of the cycles extremely difficult. The net gain provided by this invention over the conventional cycle is represented approximately by the area DLMN and this energy or power may be used, as for example, to generate electrical power, to recompress steam, or for other purposes.

The liquid of the present invention after being expanded to a saturated state at point N is thereafter utilized in a conventional high pressure steam power cycle, being mechanically dried to a saturated state at point E along segment NE on line DE, superheated along EF to point F, expanded along FG, reheated along GH and finally expanded to condenser pressure $i$ along H$i$.

It may now be understood that problems heretofore encountered, one being for example, control of the rate of feed to maintain a pressure and temperature above the critical value, is solved by the present invention in providing a parallel above critical pressure stage and a conventional high pressure stage. In this manner, the boiler drum is operated at pressure below the critical value and superheated steam temperature control may be provided by means well known in the art. As to the problem of clean steam, it has already been seen that the impurities are separated from the steam going to the steam turbine by reducing the pressure of liquid from above critical to a value providing wet steam and corresponding to the pressure in the drum.

Figure 2:
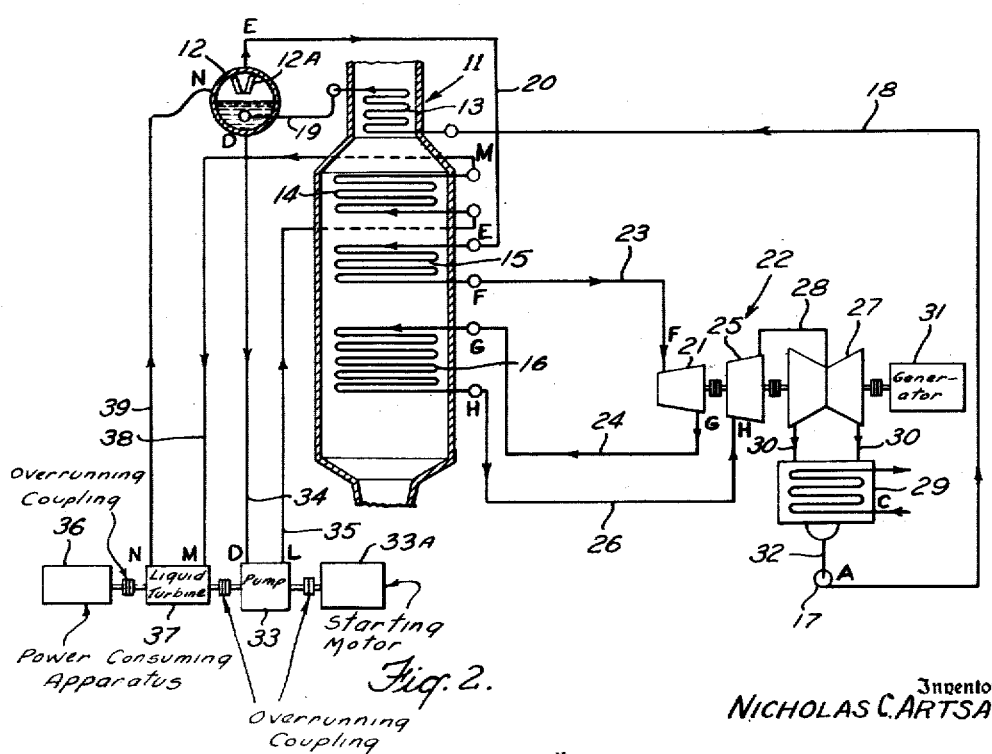
Fig. 2 is an arrangement illustrating the dual pressure stage of the present invention.

The apparatus for carrying out the above novel method is shown in Fig. 2 wherein vapor generating apparatus, generally designated by the numeral 11, comprises a fluid vessel as for example a steam and water drum 12, an economizer 13, water heating surface 14, superheater 15 and reheater surface 16. Economizer 13 communicates with a condensate feed pump 17 by way of a condensate feed line 18 and with drum 12 by a feed line 19. Superheater 15 communicates with steam drum 12 by way of a vapor line 20 and with a high pressure stage 21 of a steam turbine 22 by a high pressure turbine inlet line 23. Reheating surface 16 communicates with the exhaust of high pressure turbine stage 21 by a high pressure outlet line 24 and with an intermediate stage 25 of the turbine by an intermediate stage inlet line 26. A low pressure stage 27 of the turbine communicates with stage 25 by an intermediate stage outlet line 28 and with a condenser 29 by turbine exhaust lines 30. Turbine 22 is drivably connected to suitable output means, as for example an electrical generator 31 by a coupling. Condenser 29 is in communication with condensate feed pump 17 by a condensate line 32. Conventional regenerative feed water heaters are used in the present invention but are not shown in the drawing.

A high pressure pump 33 communicates with steam drum 12 by way of a pump suction line 34 and with the water heating surface 14 by a discharge line 35. Pump 33 is driven by a starting motor 33A and is drivably connected by suitable overrunning means to a water turbine 37 which in turn is connected by a suitable overrunning coupling to a power consuming apparatus 36. Turbine 37 communicates with the outlet of water heating surface 14 by way of a turbine inlet conduit 38 and with steam drum 12 by a turbine discharge line 39.

In operation, condensate from condenser 29, point $i$ on Fig. 1, flows through the condensate line 32 to pump 17, point A on Fig. 1, where the pressure is raised and the liquid is fed into economizer 13 where it is heated to near point D, thereafter passing into the steam drum 12. The saturated water in drum 12 passes to high pressure pump 33 by the pump suction line 34 where its pressure is raised to an economical excess above the critical value, as for example, 5,000 p. s. i., line DL. It is then passed to water heating surface 14 by the pump discharge line 35 wherein it is heated, line LM. From surface 14 the liquid flows to water turbine 37 by way of the turbine inlet conduit 18. The liquid in passing through the turbine does work so that its heat and pressure are reduced along line MN to state N (Fig. 1), which is that of wet steam. The output of turbine 37 is utilized to operate apparatus 36. In this manner, additional work is obtained here in the cycle thereby increasing the overall efficiency over conventional steam power cycles. The liquid with its pressure now reduced below the critical value is returned to drum 12 by the discharge line 39. The amount of water handled by pump 33 is in excess of the steam output of drum 12 so that the amount of excess heat returned to the drum from turbine 37 is sufficient to heat the feed water entering drum 12 from economizer 13 to saturation. The excess amount also compensates for the loss in heat and steam in bringing the liquid to state N, the loss being represented by the segment NE, which is the wetness fraction. The dry saturated vapor in drum 12 after having the moisture separated therefrom by steam drying means 12A in the drum passes to the superheater 15 through vapor line 20 wherein it is heated to a superheated state, point F in Fig. 1, thereafter flowing to high pressure stage 21 of the turbine by way of turbine inlet 23 to drive generator 31. In this high pressure stage, the vapor is expanded along line FG to point G. The vapor thereafter flows through high pressure outlet line 24 to reheater surface 16 and is heated to a higher temperature as indicated by point H on line GH thereafter returning to intermediate stage 25 of the turbine by intermediate inlet line 26 where further expansion of the vapor takes place. The vapor next passes into turbine low pressure stage 27 and finally expands to condenser pressure $i$ on line H$i$ whereby condensation in the condenser 29 occurs and the saturated vapor becomes liquid to be returned to the starting point A of the cycle along line $i$A.

Apparatus comprising several embodiments for utilizing the net power from the arrangement of Fig. 2 are diagrammatically illustrated in Figs. 3, 4, 5, 6, 6A and 6B, and like parts are given the same reference characters.

Figure 3A:
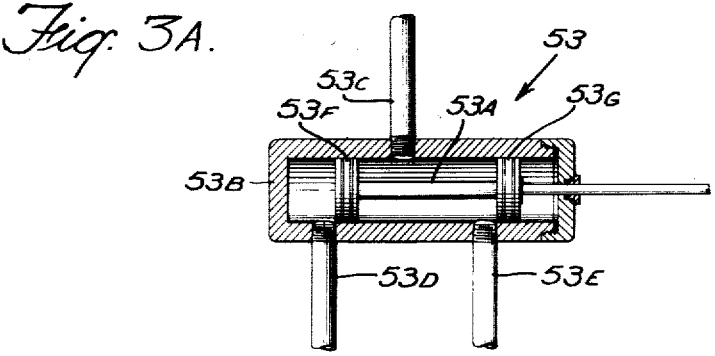
Fig. 3A is a sectional view of a distributing valve used with some of the embodiments in Figs. 3 to 6B.
Figure 3B:
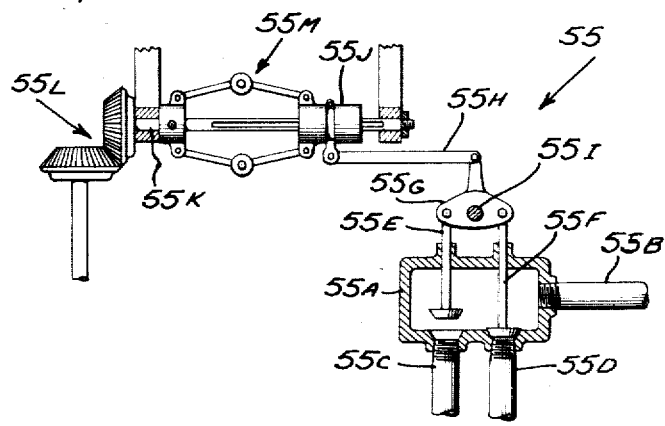
Fig. 3B is a sectional view of an overspeed emergency valve used in the embodiments in Figs. 3 to 6B.

In Fig. 3, a motor 45 is drivably connected to pump 33 through an over-running coupling 46 and the pump in turn, is drivably connected by a similar over-running coupling 47 to water turbine 37. A relief valve 48 is arranged in a by-pass conduit 49 connecting the pump outlet with a main outlet line 50, which outlet line communicates with vapor drum 12. Relief valve 48 operates to by-pass liquid from the pump outlet to the main line when, for any reason, the pump outlet pressure increases above a predetermined value. An orifice 48A communicates with valve 48 to prevent throttling in the latter. A valve 35A, as for example a check valve, is provided in conduit 35 to prevent back-flow in an emergency. Arranged in an outlet conduit 51 of water heating surface 14 is a minimum pressure regulating valve 52 of conventional type, as for example a spring-loaded diaphragm valve, which restricts passage of fluid until a predetermined pressure occurs in the conduit. A movable distributing valve 53, shown in Figs. 3 and 3A, comprises a piston 53A slidable in a cylinder 53B which includes an inlet 53C and a pair of outlets 53D and 53E. Piston 53A has a pair of spaced lands 53F and 53G which are arranged to cover outlets 53D and 53E, respectively. Piston 53A may be considered in a centralized position when lands 53F and 53G cover outlets 53D and 53E. The movable distributing valve 53 has its inlet 53C connected to conduit 51 and outlet 53D connected to a line 54 communicating with the inlet of water turbine 37. The valve 53 permits passage of liquid to line 54, but in certain positions thereof, restricts or decreases the liquid flow to the line, that is, when piston 53A is moved from the position shown in Fig. 3A toward the centralized position. An over-speed emergency valve 55, as for example, a valve of the fly-ball type is driven by turbine 37 and is shown in Figs. 3 and 3B. Over speed emergency valve 55 comprises a housing 55A having an inlet 55B connected to line 54 and a pair of outlets 55C and 55D, respectively. Valve members 55E and 55F are connected to a rocker arm 55G which is pivoted by a link 55H about a pin 55I. Link 55H is connected to a sleeve 55J which is rotatable with and movable axially of a rotary shaft 55K driven by liquid turbine 37 through a bevel gear assembly 55L. Sleeve 55J forms part of a fly-ball assembly 55M which operates in known manner whereby when the speed of shaft 55K increases above a predetermined value, the fly-ball assembly operates to move sleeve 55J to the left as seen in Fig. 3B. Inlet 55B is connected to line 54 and outlets 55C and 55D are connected to a line 54A and a by-pass line 57, respectively. When the speed of turbine 37 is below a predetermined value the positions of valve members 55E and 55F are as shown in Fig. 3B but when turbine 37 exceeds a predetermined value, rocker arm 55G is caused to move valve member 55E toward a seating position to restrict flow of liquid to the turbine and to move valve member 55F upwardly to provide liquid flow through outlet 55D and by-pass line 57. An orifice 56 is provided in by-pass outlet line 57 of valve 55 to prevent throttling in the latter; the by-pass line 57 communicates with a turbine outlet conduit 58 connected to the main outlet line 50. In normal operation, full flow of liquid passes through valve 55 to turbine 37 but in an emergency, valve 55 diverts the flow through orifice 56 and through by-pass line 57.

Distributing valve 53 has the second outlet 53E connected to a line 59 communicating with the inlet of a water turbine 60, which turbine has its outlet connected to main outlet line 50. An over-speed emergency valve 61, identical in structure with valve 55 is arranged in line 59 and is connected to an orifice 62 in a by-pass line 63 communicating with main line 50. Valve 61 is driven by turbine 60 and its operation is identical with valve 55 insofar as flow of liquid through turbine 60 is restricted and the by-pass liquid is diverted to line 63 when the turbine exceeds a predetermined speed. Turbine 60 is drivably connected to an axial steam compressor 64, the latter being connected at its inlet to the outlet of the high pressure stage 21 of steam turbine 22 and at its outlet to a line 65 communicating with reheater surface 16. A turbine stop valve 66, well known to those skilled in the art, is arranged in line 23 to high pressure stage 21 and is operated by a governor type valve 67 to shut off supply of steam to stage 21 when the speed of the turbine increases above a predetermined value, as for example, if turbine 22 should run unloaded. Governor valve 67 is driven by turbine 22 and is substantially identical with the construction of valves 55 and 61 except that there is provided in valve 67 only one outlet and a normally unseated single valve member; the inlet of valve 67 being connected to line 23 through turbine stop valve 66 and the outlet being connected to the inlet of high pressure stage 21. As may be readily understood from the operation of valves 55 and 61, when the speed of turbine 22 exceeds a predetermined value, the single valve member in valve 67 moves toward a seating position to restrict flow of steam to stage 21.

In operation, when the arrangement of Fig. 3 is started from cold, motor 45 is operated to drive pump 33 and the burners (not shown) in the furnace are fired. The pressure in water heating surface 14 increases above the critical value by reason of valve 52 which restricts flow until a build-up of pressure above the critical value is obtained. The water from surface 14 passes through valve 52, distributing and emergency valves 53 and 55, respectively, and into turbine 37 whence it is discharged into drum 12 by way of outlet line 50. The distributing valve 53 at this time, remains fully open to the turbine 37 and closed to turbine 60. The water in surface 14 becomes heated whereby the steam pressure in drum 12 builds up to the desired value and steam is fed therefrom into the steam turbine 22. As the demand for steam by the steam turbine 22 increases, the firing rate, which is controlled in accordance with said steam demand by conventional means (not shown), also increases and a point is reached where the temperature and heat content of water in surface 14 becomes sufficiently high to drive water turbine 37 at a speed above the speed of starting motor 45. When the speed of turbine 37 increases above that of the motor, the turbine takes up the load of driving pump 33 through the engagement of coupling 47 and the disengagement of coupling 46.

The turbine 37 and pump 33 reach full speed at a light load on the steam turbine 22. Under this light load condition, the steam leaving high pressure stage 21 passes freely through steam compressor 64 rotating the latter and connected water turbine 60 at idling speed. At this time, distributing valve 53 is moved to divert some of the heated water to turbine 60 to thereby speed the latter and steam compressor 64. The steam from the compressor passes through the elements of steam reheating surface 16, into the intermediate pressure stage 25 and low pressure stage 27, and thence to condenser 29. As the load on turbine 22 and the firing in the furnace increase, more net power becomes available from turbine 60 which speeds up to compress the steam leaving high pressure stage 21 to thereby increase the efficiency of the system.

It is to be noted that when the valve 53 is moved to divert a portion of the water to turbine 60 the pressure within water heating surface 14 decreases, but not below the critical value, whereby the speed of turbine 37 is not reduced appreciably. Thus, when the turbine 22 is running under the full load, the pressure in surface 14 is above critical and the net energy, that is, the energy of the above critical pressure part of the system minus the energy required to drive turbine 37 is utilized by turbine 60 to increase the overall efficiency of the system. When the electrical load decreases, the torque required to rotate the generator 31 at constant speed becomes less so that the speed of turbine 22 begins to increase. Governor 67 senses the increase in turbine speed and accordingly decreases the flow of steam to turbine 22 until the torque exerted by the latter does not exceed that required to operate the generator at the required speed. With the decreased load, the speed of turbine 60 must be reduced to prevent an excess in power from being withdrawn from the above critical pressure stage by turbine 60 and this is provided by moving piston 53A of distributing valve 53, in a direction to provide less flow of heated water to turbine 60, whereby after such movement the system again returns to equilibrium conditions under the reduced load.

To provide steam substantially free of impurities to superheater 15, the pressure and temperature of water in heating surface 14 are maintained at a desired value corresponding to that shown in Fig. 1 as point M, so that when the pressure of the water leaving turbines 37 and 60 is reduced, wet steam having a desired wetness property is discharged into the drum (point N of Fig. 1). In this manner, steam condenses on the impurities or nuclei to precipitate the latter and the impurities together with the steam flow into drum 12 where the uncondensed vapor passes through a dryer 68 and thence to superheater 15, while the moisture with the contaminants remain in the drum. The present invention provides for clean steam under all conditions of operation in the following manner: if the temperature of the water in heating surface 14 becomes too high in the operation of the system so that unclean steam results, piston 53A of valve 53 is moved to further restrict passage of water to turbine 60 so as to increase the flow of water through surface 14 to thereby reduce the temperature of the water until it reaches point M (Fig. 1). It will be understood that the flow of water through surface 14 is increased when passage of water through turbine 60 is restricted because the amount of water thus flowing through turbine 37 is increased to thereby increase the speed of pump 33 and, therefore, the flow of water through conduit 35 and surface 14.

In the event that the compressor 64 is disconnected from turbine 60 so that the latter tends to run unloaded, overspeed valve 61 diverts the flow of pressurized water from the turbine to main outlet line 50.

Figure 4:
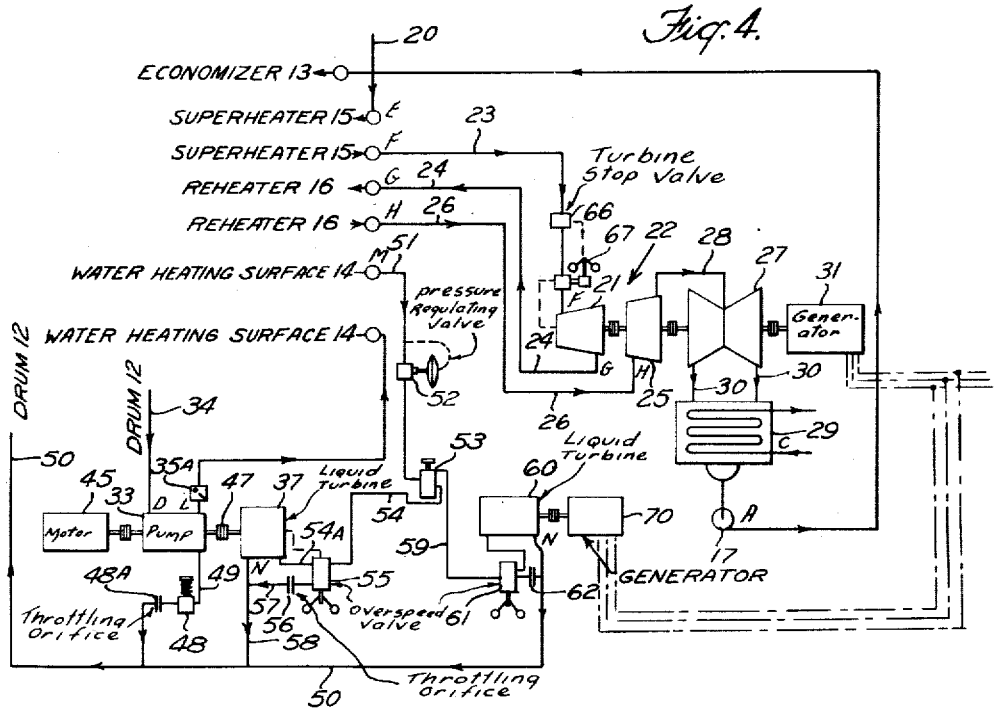

Fig. 4 illustrates a second embodiment for utilizing net power from the arrangement of Fig. 2 and omits the showing of the various heating surfaces; the showing of the latter being unnecessary for an understanding of the second embodiment. The arrangement of Fig. 4 differs from that of Fig. 3 in that the former employs an electrical generator 70 driven by water turbine 60 and the steam from high pressure stage 21 of turbine 22 is fed directly to the reheater surface 16 thence to intermediate pressure stage 25. The generators 70 and 31 may be electrically coupled together in the same electrical system and, for that reason, the water turbine 60 must be maintained at constant speed to drive generator 70 at a constant speed which corresponds to the speed of generator 31 so as to maintain the generators in phase. To this end, when pump 33 and turbine 37 are running at a speed sufficient to provide for the generation of the required net energy by turbine 60, piston 53A of distributing valve 53 is moved to a position to provide flow of pressurized water to turbine 60 in an amount sufficient for the turbine to provide the necessary torque. If the electrical load decreases, the load of both generators decreases, so that the torque required of turbines 22 and 60 is less. The governor valve 61 operates as in the first embodiment to maintain turbine 22 at the required constant speed while the flow of water to turbine 60 is changed by movement of piston 53A of valve 53 to maintain the required speed of turbine 60.

Figure 5:
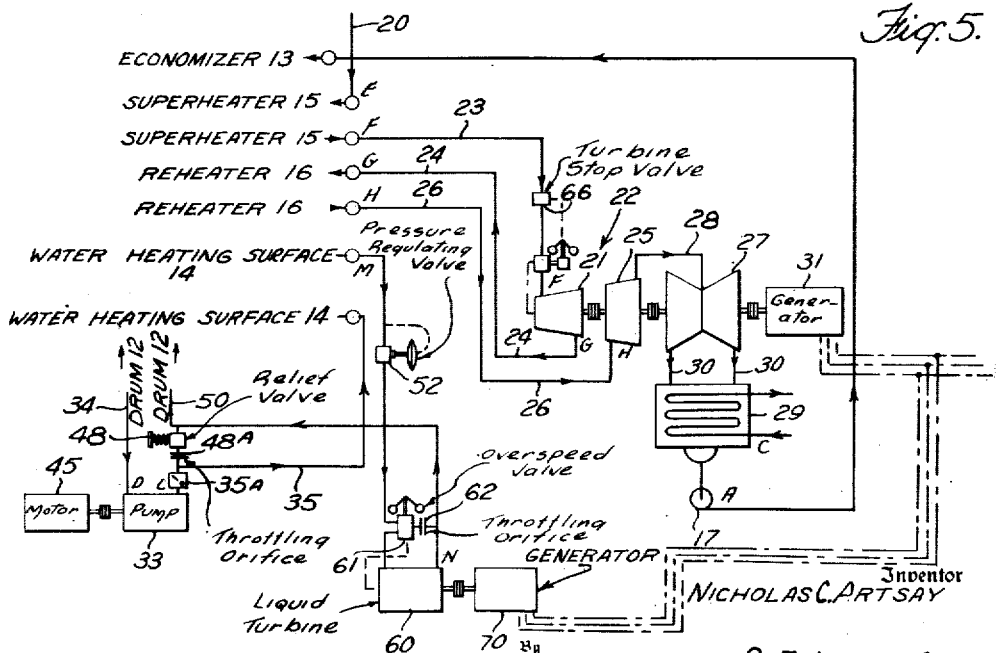

Fig. 5 illustrates a third embodiment for utilizing the power obtainable from the above critical pressure arrangement, and again only those elements necessary for an understanding of this embodiment are shown. The third embodiment differs from the first and second embodiments in the omission of distributing valve 53 and of water turbine 37 and further in the operation of pump 33 by the starting motor 45 alone, which motor is preferably designed in the present embodiment to develop full power and operate at variable speed. Water turbine 60, in this embodiment, is enlarged to have full pressurized water flow and drives generator 70 at constant speed; the generator 70 being electrically coupled with generator 31 in the same electrical system. In the present embodiment, if the electrical load decreases, the firing rate is reduced because of lower steam requirement of turbine 22 whereby the heat input to the water in heating surface 14 is decreased thereby reducing the torque exerted by turbine 60.

Fig. 6 illustrates a fourth embodiment and in this embodiment, the steam compressor 64 is divided into two stages 64A and 64B. A portion of the steam from the outlet of high pressure stage 21 is fed to a high pressure regenerative feed water heater 75, while intermediate pressure regenerative heaters 76 and 77 are supplied with steam from intermediate and low pressure stages 25 and 27, respectively, of steam turbine 22 by lines 76A and 77A, respectively. A portion of the steam from the outlet of pressure stage 21 is also fed to compressor stage 64A. A condenser pump 17 delivers feed water from condenser 29 to heaters 77 and 76, and a boiler feed water pump 78 delivers the heated feed water to heater 75. The feed water then passes through a pair of feed water heaters or desuperheaters 79 and 80 and finally is delivered to economizer 13. An outlet 75A is provided for each heater 75, 76, 77 and 79 and 80 to conduct condensed vapor from each of the latter to condenser 29; the lines representing outlet 75A are not shown connected to the condenser in Fig. 6 in order to not unduly complicate Fig. 6.

In operation, compressor stage 64A compresses the steam delivered to it and compressed steam is fed to heater 79 which serves as an intercooler to desuperheat the steam. The desuperheated steam is then delivered to compressor stage 64B where the desuperheated steam is compressed further and then delivered to heater 80 where it is condensed. The compressor 64 together with turbine 60 in this embodiment, serve as a heat pump and with the heaters 79 and 80 increase the regenerative effect. It may be readily understood that by desuperheating the steam before compression by compressor stage 64B, a greater transfer of heat is provided than if superheated steam were compressed by the last-mentioned compressor stage. The increased temperature of water effected by the heat pump will reduce the amount of heat required for producing steam for the turbine 22, and hence increase the efficiency of power generation.

Fig. 6A illustrates a fifth embodiment of the present invention and represents an improvement over the arrangement illustrated in Fig. 6. Only the portions of Fig. 6 necessary to an understanding of this embodiment are shown in Fig. 6A.

In the fifth embodiment all of the steam from the outlet of high pressure stage 21 passes directly to heat exchanger 75 where the steam is desuperheated and the desuperheated steam is fed to compressor stage 64A. The desuperheated steam is compressed in stage 64A and is delivered to feed water heater 79 where it is further desuperheated and thence recompressed in compressor stage 64B. The recompressed vapor is then passed in heat exchange relationship with the feed water in heater 80 where it is totally condensed. The totally condensed vapor, now a liquid, is cascaded by way of conduit 81 to the other feed water heaters 79, 75, 76 and 77, respectively. Conduit means 82 is connected to conduit means 81 and feeds the condensate therefrom through valves 83 and 84 to compressor stages 64B and 64A, respectively.

In operation, steam from high pressure stage 21 of steam turbine 22 is desuperheated in feed water heater 75 in which the desuperheating section is enlarged to accommodate the additional flow of steam. Steam of substantially reduced volume enters compressor stage 64A and after having its pressure raised is passed to heater 79 where a part of it is condensed. The balance of the steam is desuperheated and reduced in volume and then fed to compressor stage 64B where its pressure is raised, after which it is fed to heater 80 and totally condensed therein. It is to be noted that the two step reduction of volume of steam by heat exchangers substantially increases the final pressure and the quantity of steam compressed, to thereby increase the heat returned to the feed water. Part of the condensate from heater 80 is fed by way of conduit means 82, and valves 83 and 84, to compressor stages 64A and 64B where it is mixed with steam entering both compressor stages. By this addition of water, the compression, by compressor 64 is changed from an adiabatic type of compression of initially dry steam, to a polytropic type of compression of initially wet steam which approaches the isothermic type of compression and requires a minimum expenditure of energy for compression. Thus, with a given energy a higher final pressure results which in turn provides more steam for use in the heat pump and more heat returned to the feed water with a resultant increase in overall efficiency of the entire cycle.

Fig. 6B illustrates another embodiment of the present invention and is similar to the embodiment disclosed in Fig. 3 and related to the embodiments in Figs. 6 and 6A. Only the portions of the last mentioned figures necessary for an understanding of this embodiment are shown in Fig. 6B. In this last embodiment a plurality of extraction feed water heaters 84A (four shown) are connected serially to receive feed water from condensate feed pump 17 through a line 84B. The feed water heaters 84A are connected to receive exhaust steam discharged from intermediate pressure stage 25 and low pressure stage 27 of steam turbine 22 for heating the condensate in said heaters. The exhaust steam is condensed in heaters 84A and passed out of the latter for collection in condenser 29. The heated condensate, hereinafter referred to as feedwater, from heaters 84A is conducted to a direct contact heater 84C which is also connected to receive exhaust steam from intermediate pressure stage 25 through a conduit 84D. The steam in heater 84C is condensed and together with the feedwater from heaters 84A is passed through a boiler feed pump 84E to a feed water heater 84F. A conduit 84G communicates with intermediate pressure stage 25 and heater 84F to supply the latter with exhaust steam which passes in indirect heat exchange relationship with the feedwater therein. The feed water from heater 84F then is conducted to a desuperheating heater 84H where it passes in heat exchange relationship with exhaust steam from high pressure stage 21 which steam is conducted to the heater through a conduit 84I. The steam in desuperheating heater 84H is cooled whereby the volume thereof is reduced. The desuperheated steam is then conducted to compressor 64 where the pressure of the steam is increased and returned to reheater 16 through conduit 65. The feed water from desuperheating heater 84H is conducted through a conduit 84J to drum 12 rather than to economizer 13 as in the prior embodiments.

In the last mentioned embodiment it will be apparent that the desuperheating heater 84H reduces the volume of steam to be recompressed by compressor 64 and hence higher pressure is reached by the utilization of the power of the above critical cycle which is available on the compressor's shaft. This higher pressure of steam after being reheated increases the power transmitted to the steam turbine shaft from the above critical pressure cycle and results in substantially higher thermal efficiency.

It is to be understood that the amount of available net energy or power from the above critical pressure part of the cycle in each of the described embodiments varies with the load and operating conditions. In each embodiment the flow of water is within the excess of the requirements for wet steam at the outlets of the turbines 37 and 60, and the pressure at the last stages of the water or liquid turbines is sufficiently low to provide for wetness of steam necessary to remove the impurities.

In the conventional steam generator, the total firing rate is controlled to maintain pressure of steam constant at one or more desired points, as for example, in the drum, superheater outlet, or at the turbine throttle; the distribution of heat from the fuel burned between the different heat absorbing surfaces must be such that the temperature of steam leaving the superheater and reheater is at the desired value. For the above critical pressure steam generator, however, there is an additional condition, namely that the pressurized water must be heated to a temperature assuring the required degree of wetness in steam leaving the water turbine to provide concentration of impurities in the moisture for mechanical separation in the drum. Various systems have been devised for simultaneously controlling the steam pressure and the temperatures of the superheated and reheated steam, but such systems for above critical pressure water heating surfaces have been found to be unsatisfactory because the amount of net power in water flow available between the pump inlet and the water turbine outlet is reduced. With the above heretofore control systems for above critical pressure arrangements, the heat economy is impaired because redistribution of heat absorption within the steam generator to control steam superheat and reheat temperatures results in higher feed water temperature entering the drum, which, in turn, reduces the possible heat input into the pressurized water and hence the net power from it.

A novel steam generator for the above described embodiments is illustrated in Figs. 7 and 8 wherein the generator, generally designated by the numeral 85, comprises three independently fired furnaces, 86, 87 and 88, which furnaces heat the pressurized water, superheat the steam and reheat the steam after expansion in the steam turbine 22, respectively. The furnaces may be fired with pulverized coal, oil or gas through burners 89 some of which are shown in Fig. 7. The walls of the furnaces are completely covered with heating elements and the furnaces 86 and 87 have ash pits 90. Furnace 88 is arranged to spill ashes into furnace 87. The gas generated by combustion of fuel in furnace 88 passes through furnace 87 and thence enters a convection zone 91 where it is joined by combustion gases generated in furnaces 86 and 87; the curved arrows indicating combustion gas flow while the straight arrows indicate steam and water flow. Furnaces 88 and 87 and convection zone 91 are separated by access spaces 92. A steam separating drum 94 is arranged in the rear of the steam generator 85 (shown in broken lines in Fig. 7 and in full lines in Fig. 8) and communicates with an economizer 96 by way of a conduit 97. Feed water enters economizer 96 through a conduit 98 and is there preheated by flue gas from the furnaces. Steam in the drum 94 passes through a dryer or separator 99 (Fig. 8) then through multiple pipe and tube connections 100 to a superheater inlet header 101 (Fig. 7). Steam from inlet header 101 passes through tubes arranged on the right side wall 102 of furnace 87 (Fig. 7), into an intermediate header 103, which header is connected by tubes 104 to headers 105 (one shown in Fig. 7) arranged on both the front and rear walls of furnace 87. The steam from headers 105 passes upwardly in tubular elements arranged on the front and rear walls and enters upper headers 106. The upper headers 106 are connected by tubular elements 107 to an intermediate header 108 and the steam passes from the latter downwardly in tubular elements 109 arranged on the left wall of furnace 87 and into an outlet header 110 and thence into the steam turbine 22 (not shown in Figs. 7 and 8). None of the superheating elements is exposed to convection heat transfer in zone 91, and in this manner the final steam temperature is controlled by adjusting the fuel firing rate in furnace 87 and thereby provide independent firing control.

The steam partially expanded in steam turbine 22 enters an inlet header 111 which communicates with the tubular elements arranged on the walls of steam reheating furnace 88. The steam in furnace 88 is divided into two flows, one flow making two up and down passes in tubular elements 112 along both the front and rear walls of the furnace and discharging into an outlet header 112A, while the other flow makes one pass along the right wall up into a transfer header 113 and then down through tubular elements 113A along the left wall to outlet header 112A. Since the tubular elements are affected by the heat in furnace 88 alone, the rate of firing in furnace 88 controls the temperature of reheated steam.

Saturated water is conducted from drum 94 by pipes 114 to pressure raising pump 33 which brings the pressure of the water to a value well above critical. The pump discharges the water to an inlet header 115 of a water heating surface. Water from header 115 passes through coil tubes 116 which are exposed to convection heat transfer of the gas generated in the furnaces and the water is collected in a first intermediate header 117. From header 117 part of the water passes through tubular elements 118 arranged on the left wall of convection zone 91 and then into a collecting header 119. The remaining water from header 117 passes into a header 117A thence through pipes 117B arranged on both front and rear walls and finally to a lower header 119A whence the water flows into collecting header 119. From collection header 119 the water passes to an upper distributing header 120 by way of tubular elements 121 arranged on the right wall of the convection zone. The water from header 120 flows to a header 120A and in parallel through tubular elements 86A arranged on the four walls of furnace 86 and collects in lower outlet headers 121A. The water in furnace 86 is heated to the required temperature and then fed through piping 122 into a water turbine 123 which, after reducing the pressure of the water by doing work, produces wet steam and discharges the latter into drum 94 by way of piping 124.

The mechanism 125 driving pump 33 may be an electric motor as described hereinabove, while mechanism 126, which is driven by turbine 123, utilizes the generated power and may be either a steam compressor or an electric generator, as described hereinabove.

All of the heated pressure parts as described herein, are supported from the overhead steel beams and columns 126A (diagrammatically shown) and being suspended from the top the pressure parts freely expand downwardly.

In the operation of a parallel cycle arrangement as set forth hereinbefore it is important to effect the same value of wetness in the fluid leaving the liquid turbines 37 and 60 at fractional loads as at full load in order to insure the precipitation of impurities for separation in the sub-critical cycle. To this end, Figs. 9 and 10 disclose an arrangement which provides automatic control means for the maintenance of the pressure and temperature of the fluid flowing through the above critical pressure cycle at a value to effect the desired cleanliness of steam at fractional loads as well as at full loads. The automatic control means of Figs. 9 and 10 to be described are in a sense improved modifications of the control valves 52 and 53 shown in Figs. 3 and 6, in addition to being automatically operated controls. The arrangement of Fig. 9 embodies a desuperheater and steam compressor as found in the embodiment disclosed in Fig. 6B, however, it is to be understood that the automatic control may be utilized in any of the embodiments disclosed herein. Like reference characters are employed wherever the elements of Fig. 9 have functions identical with those disclosed in the other figures.

Figure 9:
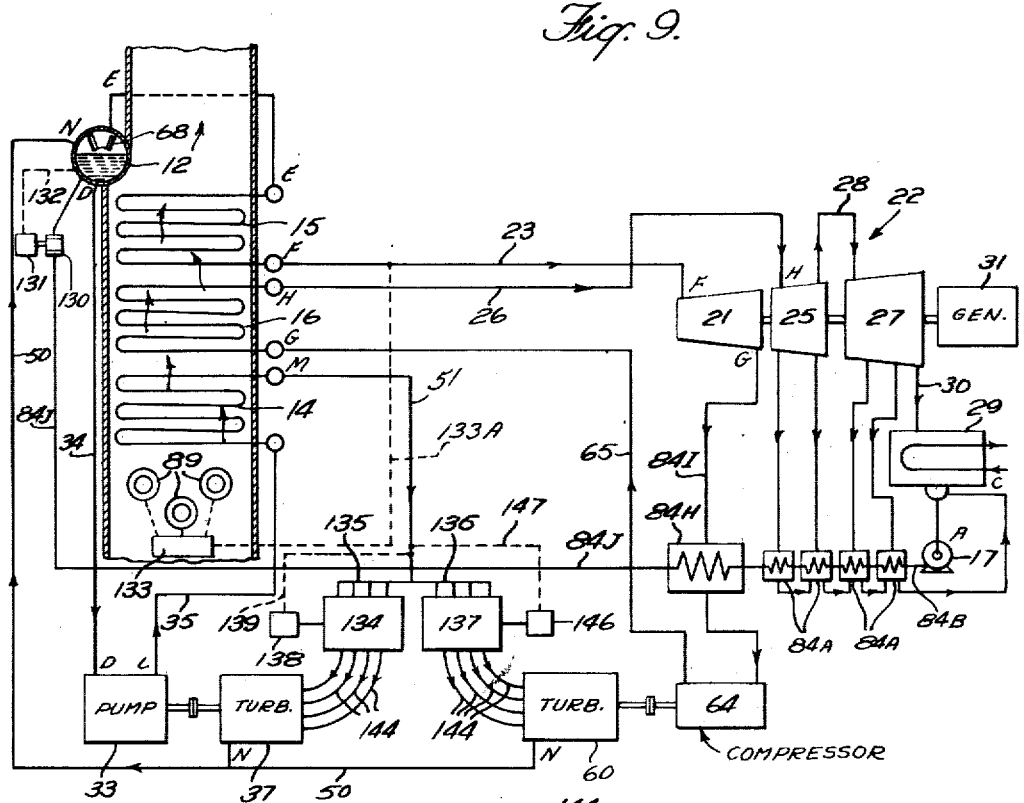
Fig. 9 is a schematic representation of an arrangement of the present invention and shows in particular, automatic means for regulating the temperature and pressure of the water in the above critical cycle during full load and fractional loads.
Figure 10:
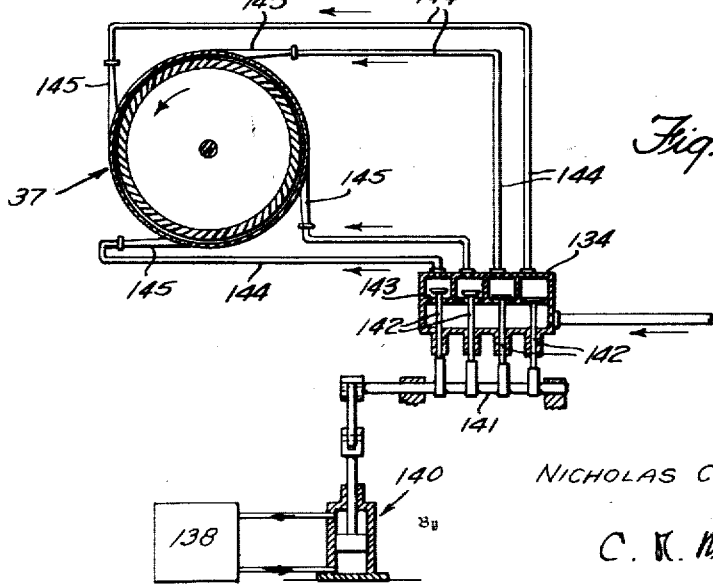
Fig. 10 is a diagrammatic illustration of one of the valve chests and liquid turbines of Fig. 9.

In the arrangement of Fig. 9, the liquid level in steam and water drum 12 is maintained at a predetermined level by control means which comprise a valve 130 in feed water conduit 84J for regulating the flow of water into drum 12, and a controller 131 connected for operating the valve. The liquid level controller is conventional and may take the form of a float type control in which event controller 131 senses the level of water in drum 12 through a line 132 (shown as a broken line) and actuates valve 130 in the proper direction when the level departs from the desired value. A control also is provided for controlling the firing rates of burners 89 (shown schematically in Fig. 9) with varying loads on steam turbine 22 by generator 31 to maintain a predetermined pressure in steam line 23 which communicates superheater 15 with high pressure stage 21. The control comprises a pressure actuated controller 133 which senses the pressure in conduit 23 by way of a pressure line 133A (shown as a broken line) and controls the firing rate of burners 89. It will be understood that when the pressure in line 23 increases, as for example, upon a decrease in load on turbine 22, controller 133 operates to decrease the firing rate of burners 89 and as a result, the pressure in line 23 decreases to the predetermined pressure. Conversely, if the load on turbine 22 increases the pressure of steam in line 23 decreases and controller 133 operates to increase the firing rate to thereby return the pressure of steam to the predetermined value.

Conduit 51 is connected to the outlet of water heating surface 14, as in the other embodiments, to conduct a portion of the above critical liquid or water from surface 14 to a turbine valve chest 134 (to be more fully described hereinafter) by way of a branch conduit 135 to operate liquid turbine 37. Another portion of the water in conduit 51 is conducted by way of a branch conduit 136 through a separate turbine valve chest 137, identical to valve chest 134, thence to liquid turbine 60 drivably connected to the steam compressor 64. The fluid exhausted from turbines 37 and 60 is conducted to steam and water drum 12 by way of conduit 50.

As indicated hereinbefore under full load operating conditions of steam turbine 22, pump 33 is operated by turbine 37 to maintain the pressure of the fluid in water heating surface 14 at above critical pressure and the temperature of the fluid at a value which provides the necessary wetness of fluid at the exhaust end of turbines 37 and 60. By providing similar percentage of wetness in the fluid exhausted from the liquid or water turbines, initially dissolved contaminants brought in by the feed water are concentrated in a fog and the exhausted fluid is returned to the drum where the contaminants are separated from the fluid or steam by separator 68. Under this condition turbine 37 utilizes sufficient energy to maintain the desired rate of flow and pressure of the fluid, and the remaining energy or so called "net power" is available for operating turbine 60; turbine 60 in turn driving compressor 64 in the sub-critical cycle.

In order to obtain maximum thermal efficiency at fractional loads on the steam generator it is necessary that the pressure of the water in the above-critical cycle be kept at the same high value at full load and the flow of water to the water heating surface controlled to effect a temperature for maintaining the required wetness of the fluid discharge from the fluid turbines. To this end, a conventional temperature controller 138 (shown as a box) is provided for sensing the temperature of the water in water heating surface 14 by way of a line 139 (shown as a broken line). Controller 138 is connected for operating a hydraulic servo unit 140 (Fig. 10) which actuates and angularly displaces a control cam shaft 141 having cams upon which ride the ends of valve stems of a plurality of valves 142 in valve chest 134, shown as a box in Fig. 9 but illustrated diagrammatically in section in Fig. 10. Valve chests 134 and 137 are identical in construction and operation, and therefore, only chest 134 is disclosed in detail in Fig. 10. Valves 142 are adapted for seating in valve outlet seats 143 in valve chest 134 and depending upon the contour of the cams on shaft 141 the valves cover or uncover valve outlet seats 143 to regulate the flow of fluid from the outlets. A nozzle conduit 144 is connected in communication with each valve outlet seat 143, at their other ends to radial inlet turbine nozzles 145 circumferentially spaced around the peripheries of liquid turbines 37 and 60. In the present invention, the cams on shaft 141 are shaped to provide serial operation of inlet nozzles 144 upon rotation of the shaft, in a manner well known in the art. Moreover, the cams are contoured to effect the partial opening of only one valve at any given load and hence throttling. By having only one valve throttling losses of available energy are reduced to a minimum herein. The temperature controller 138, in response to the temperature of the water in conduit 51, serves to regulate the power and speed of liquid turbine 37 by controlling the movement of the valves to thereby regulate the flow of water from surface 14. A conventional pressure controller 146 (shown as a box in Fig. 9) senses the pressure of the water in conduit 51 and therefore in surface 14 by way of a line 147 (shown as a broken line). As pointed out hereinbefore, valve chest 137 is identical with valve chest 134 and pressure controller 146 operates to angularly displace the control cam shaft of chest 137 to control the opening and closing of the valves therein for regulating the flow of water to inlet turbine nozzles arranged in liquid turbine 60, which is identical with fluid turbine 37. Pressure controller 146 allows water to flow to turbine 60 only in an amount which remains after supplying turbine 37. In this manner, the amount of heat made available to the above-critical pressure cycle by surface 14 is distributed so as to provide correct water temperature and pressure to achieve maximum availability of net or residual energy by turbine 60.

In operation, when steam turbine 22 is operating at a full load the firing rate controller 133 and liquid level controller 131 provide for a predetermined firing of burners 89 and for the maintenance of a predetermined liquid level in drum 12, respectively. During this time pressure and temperature controllers 146 and 138, respectively, operate to maintain pressure of water in water heating surface 14 at above critical pressure and at a temperature sufficient to cause the fluid from turbines 37 and 60 to be discharged "wet" and containing contaminants. The wet fluid from both liquid turbines is returned to drum 12 by conduit 50 and the fluid or the steam has the contaminants separated therefrom by the separator 68 whereby substantially clean steam is conducted to superheater 15. The superheated steam then passes to high pressure stage 21 of steam turbine 22 whence it is discharged and passes to desuperheating heater through conduit 84I to desuperheating heater 84H. The desuperheated steam is then compressed by compressor 64 whence it flows to reheater 16 by way of line 65 and the reheated steam is then fed to the intermediate and low pressure stages 25 and 27, respectively. When, for example, the steam generator operates at fractional loads, the pressure of steam in steam line 23 increases and this change in pressure is sensed by firing rate controller 133 which then operates to decrease the firing rate of burners 89. As a result, the heat available to water heating surface 14 decreases and the temperature of the water therein is consequently reduced. Temperature controller 138 senses the reduction in temperature and operates to decrease the speed of turbine 37 and pump 33 to reduce the flow of water through surface 14 in order to raise the temperature of the water to its predetermined value. Turbine 60, however, is still operating under conditions at full load on steam generator 22 and consequently the pressure of water in surface 14 commences to decrease. Pressure controller 146 senses the reduction in pressure and operates to decrease the flow of water to turbine 60 whereby the pressure in surface 14 and conduit 51 commences to return to a pressure which is equal to the pressure under full load conditions of steam generator 22. The foregoing continues until a point of equilibrium is reached where the temperature and pressure of the water in water heating surface 14 are at the same values as when the steam generator is operating at full load.

In Fig. 11 an arrangement is disclosed which includes means for starting-up systems embodying the subject invention and further includes means for preventing water hammer in the exhaust piping from the liquid turbine to the water and steam drum 12. The elements constituting the sub-critical pressure part of the system are not shown in Fig. 11 but it is to be understood that it forms part of the system shown in said figure.

A starting motor and pump set is provided in the arrangement of Fig. 11 and comprises a motor 150 which is connected for driving a high pressure starting pump 151. The inlet of pump 151 is connected to receive water from water in steam drum 12 by way of a conduit 152 and a branch line 153 while the outlet of pump 151 is connected to a conduit 154 which in turn is connected to line 35 to communicate the pump with the inlet of water heating surface 14. A conduit 155 is connected to the outlet of the water heating surface and is provided with a starting valve 156. A plurality of parallel arranged pressure actuated valves 157 (only three shown) are provided in communication with starting valve 156 and are adjusted to open at a pressure slightly above critical, as for example, 3300 p. s. i. Each relief valve is provided with a flash orifice 158 and a diffuser 159 which are in communication with a receiving header 160. In actual construction, header 160 extends longitudinally of the drum and the header and drum are connected by tubes 161 to provide for correct distribution of steam along the drum length. A pressure actuated relief valve 162 is arranged in a line 163 connected to conduit 155, and the flash orifices and diffusers are parallel connected to line 163. Valve 162 is constructed and positioned to sense the pressure in conduit 155 and when the pressure in the latter exceeds the predetermined value, as for example, about 5000 p. s. i., the valve operates to cause the fluid in conduit 155 to bypass starting valve 156 and relief valves 157, whereby the fluid flows directly into flash orifices 158.

Conduit 51 is connected to the outlet of water heating surface 14 and to branch conduits 135 and 136 as in Fig. 9, but there is additionally disclosed in Fig. 11 a turbine stop valve 165 for each of the turbines 37 and 60, which stop valves are arranged in branch conduits 135 and 136, respectively. A steam and water separator as for example, a baffle type separator 166 is connected to the exhaust or discharge end of each liquid turbine and serves to separate steam and water from the mixture discharged from the turbines. The discharged mixture enters at one side of the separator whereby the mixture impinges upon the baffle therein. As a result, substantially all of the water falls to the bottom of the separator while the steam flows to the other side of the separator whence it passes into a conduit 167. The conduit 167 of each separator is connected to a steam return line 168 which is in communication with steam receiving header 160. The water in the bottom of the separators 166 flows into a water conduit 169 which is connected to a sump 170 wherein the separated water is collected. A small amount of steam not separated from the water in the separator separates in sump 170 and is fed to steam return line 168 by a conduit 171. A sump pump 172, driven by a motor 173, is provided for delivering separated water in sump 170 to conduit 152 where the water is fed to either pump 151 or pump 33. Sump pump 172 operates continuously, and in order to avoid dry operation thereof, as for example where the amount of water driven from the sump is greater than that delivered for a prolonged period of time, a level control is provided which effects recirculation of the sump water through the sump pump and back to the sump. The level control comprises a return valve 174 which is operable by a controller 175 and is actuated in response to departure of the liquid level in the sump from a predetermined level. When the liquid level is at the predetermined value return valve 174 is closed whereby water passes through sump pump 172 and flows to the inlets of the high pressure pumps. When the level of the sump water decreases below the predetermined level, however, controller 175 is actuated to open return valve 174 whereby the sump water passes through pump 172 and through the return valve to return again to the sump.

In operation, when the system is started from cold condition turbine stop valves 165 are closed and the motor 150 is operated to drive pump 151 which delivers water to conduit 154 and line 35 to water heating surface 14. Since turbine stop valves 165 are closed water passes from the water heating surface through conduit 155 and starting valve 156, which valve is open at start-up. When the pressure of the water in conduit 155 reaches a value slightly above critical, i. e. 3300 p. s. i., as assumed hereinabove, relief valves 157 open to allow passage of the above critical water through flash orifices 158, diffusers 159 and into receiving header 160 whence the water flows into drum 12 through tubes 161. With the system so pressurized, burners 89 in the furnace chambers are lighted and the water therein is heated and flashed into steam in the flash orifices 158 whereby the steam pressure in drum 12 gradually builds up. When the steam pressure in drum 12 reaches the rated value steam turbine 22 is started in the customary manner. Concurrently, burners 89 in the chambers containing the superheater 15 and reheater 16 are lighted. Thereafter when the steam turbine is operated at the required load turbine stop valves 165 are "cracked" or slightly opened to heat liquid turbines 37 and 60 which discharge water to separators 166 thence to sump 170; turbine stop valves 165 are fully opened when the turbines are sufficiently heated. At this point in the starting of the system the pressure in the supercritical part is that maintained by relief valves 157 while the drum pressure is at a value of approximately 2000 p. s. i. All of the water in the supercritical part of the system passes through only the nozzles of liquid turbine 37 because the system at this time is operating at below normal operating pressure and, therefore, the pressure control arrangement of Figs. 9 and 10 operates to close the nozzles of turbine 60, while the temperature control arrangement maintains the nozzles of turbine 37 open an amount to provide for the predetermined temperature of the liquid in the supercritical part. Starting valve 156 is then closed and as a result the pressure in the supercritical part thereby will rise to a normal operating pressure, as for example, approximately 4500 p. s. i. With the system now operating at the last mentioned pressure, the pressure control arrangement serves to open the valve outlet seats of valve chest 137 whereby turbine 60 is operated to drive compressor 64 and the system commences normal operation. When turbine 37 is operating to drive pump 33 at the required speed starting motor 150 is disconnected from pump 33. In the event the system pressure increases above the desired operating value, as for example 5000 p. s. i., relief valve 162 is actuated to an open position to discharge fluid from the water heating surface 14 through flash orifice 158 thence to drum 12.

As indicated hereinbefore, one of the problems encountered by heretofore proposed above critical pressure cycles had been in the control of the final steam temperature to the steam turbine which control was difficult to obtain because of the necessity of regulating the feed water with respect to the combustion rate to maintain the pressure above the critical value. This problem is solved by the present parallel cycle arrangement which provides for the functioning of the water and steam drum at pressures below the critical value and control of final steam temperature by means well known in the art.

There are instances where it may be desired to utilize the present invention without exhausting the fluid from liquid turbines 37 and 60 as wet steam but rather to provide discharge of fluid from the liquid turbines as superheated steam. One reason for such use would be to obtain a higher thermal efficiency which results from the water in heating surface 14 being heated to a higher temperature in the latter prior to flowing through the liquid turbines. Although contaminants or impurities will then pass through elements of the sub-critical pressure part it would be in some instances less expensive to clean the elements rather than operating at the lower temperatures in the water heating surface 14. Moreover, the operation of the present invention in providing higher temperatures in surface 14 to exhaust superheated steam from the liquid turbines would be feasible, at some future date, when chemical compounds are discovered which are stable at high temperature and treat the feed water so as to eliminate the problem of contaminants and corrosion therein.

Any of the apparatus disclosed hereinbefore is capable of operation at the higher temperatures in water heating surface 14 but for purposes of explanation the embodiment of the invention illustrated in Fig. 6B is selected and is shown in Fig. 12 of the drawings. Since the system in Fig. 12 includes elements which are found repeatedly in the other figures description of Fig. 12 will be limited to explanation of the system as relating to operation at higher temperatures of water in heating surface 14.

In the arrangement disclosed in Fig. 12 the firing rate of burners 89 is set at a level which provides a temperature value of the water in surface 14 which will effect the discharge of fluid from the liquid turbines in the state of superheated steam. For purposes of explanation of the foregoing, reference may be had to the entropy-temperature chart of Fig. 1 wherein the fluid in surface 14 is heated to a point, as for example, point M' on the chart and discharged from liquid turbines 37 and 60 to a point, as for example N'. The points M' and N' are not necessarily restricted by the present invention to that shown in Fig. 1 but may be selected anywhere on the other side of the curve BC of liquid vapor line ABC as long as the exhaust point falls outside of curve BC. The superheated steam from the liquid turbines is exhausted at a pressure substantially equal to the pressure in drum 12 and is conducted through conduit 50 to a plurality of diffusers 180 connected to a header 181. The preheated feed water from desuperheating heater 84H is conducted through conduit 84J, connected to conduit 50, and sprayed into contact with the superheated steam flowing in the conduit. Thus, the feed water is heated to saturation and passes together with the steam through diffusers 180, header 181 and connecting pipes 182 into drum 12. Some of the steam is condensed by the feed water and hence the amount of water circulating in the supercritical pressure part of the system is greater than the amount of steam leaving the drum for use in steam turbine 22. In the case where effective chemical compounds are not available, the steam from the liquid turbines contains contaminants and the action of the feed water spray in the exhaust steam effects a partial cleaning of the latter by reducing the carried over impurities due to the washing action of low concentration feed water. The continuous action of the spray also prevents undesirable overheating of the drum in the upper part thereby, which overheating would occur if the steam were not thoroughly cooled to saturation in all its volume.

It will be understood that the arrangements shown in Figs. 9 and 11 may also be employed for conditions of operation of dry steam exhausted from the liquid turbines. In the arrangement of Fig. 11, appropriate valves to cut out the separators, as for example valve 166A and sump, as for example valve 170A from the system may be provided to effect the foregoing operation.

Another arrangement of the present invention is disclosed in Fig. 13 of the drawings and is operable under conditions of either wet steam exhausted from the liquid turbines or of superheated steam discharged from the liquid turbines. In Fig. 13 liquid turbine 60 is drivably connected to the shaft of the steam turbine 22 rather than to a steam compressor or electrical generators as shown hereinbefore. In this manner, the net energy obtained from the supercritical stage of the present invention is impressed directly on the shaft of the steam turbine.

It is now apparent that the present invention provides novel method and apparatus for obtaining a steam power cycle of high efficiency. By providing a two pressure stage arrangement, that is a conventional high pressure stage and an above critical pressure stage a practical arrangement may be employed to overcome the problems concerning past above critical pressure arrangements.

Although several embodiments of the present invention have been illustrated and described in detail, it is to be understood that the invention is not limited thereto. Various changes can be made in the steps of the methods and in the design and arrangement of the parts without departing from the spirit and scope of the invention as the same will now be understood by those skilled in the art.

What is claimed is:

1. The method of producing a power cycle of high efficiency which comprises compressing a liquid to a sub-critical pressure, heating the liquid to the saturation temperature, compressing and heating the liquid to raise the pressure and temperature thereof to values above the critical point, decreasing the pressure of said liquid, by making it do work, to said sub-critical pressure to change the liquid to a wet vapor containing impurities, removing the moisture and impurities from said vapor, expanding the clean vapor, by making it do work, and condensing the vapor to a liquid state.

2. The method of producing a power cycle of high efficiency which comprises compressing a liquid to a sub-critical pressure, heating the liquid to the saturation temperature, compressing and heating the liquid to raise the pressure and temperature thereof to values above the critical point, decreasing the pressure of said liquid, by making it do work, to said sub-critical pressure to change the liquid to a wet vapor to provide for concentration of dispersed impurities in the moisture of said wet vapor, passing the wet vapor through a separator to separate the moisture and impurities from the vapor to provide a clean vapor, expanding the clean vapor by making it do work, and condensing said expanded vapor to a liquid state.

3. The method of producing a power cycle of high efficiency which comprises compressing a liquid to a sub-critical pressure, heating the liquid to the saturation temperature, compressing and heating the liquid to raise the pressure and temperature thereof to values above the critical point, decreasing the pressure of said liquid, by making it do work, to said sub-critical pressure to change the liquid to a wet vapor containing impurities, removing the moisture and impurities from the vapor to provide a clean vapor, superheating said clean vapor, expanding said superheated vapor by making it do work whereby the pressure and temperature of the vapor are further reduced, and condensing the vapor to a liquid state.

4. The method of producing a power cycle of high efficiency which comprises compressing a liquid to a sub-critical pressure, heating said liquid to the saturation temperature, compressing and heating the liquid to raise the pressure and temperature to values above the critical point, decreasing the pressure of said liquid, by making it do work, below the critical point and to a value to change the liquid to a wet vapor, separating the moisture from said wet vapor, superheating said vapor, expanding said superheated vapor by making it do work whereby the pressure and temperature of the vapor are further reduced, reheating said vapor to raise the temperature thereof, expanding said reheated vapor by making it do work, and condensing said reheated and expanded vapor to a liquid state.

5. The method of producing a power cycle of high efficiency which comprises introducing a liquid into a compression zone to compress the liquid to a sub-critical pressure, passing the compressed liquid into a heating zone to raise the temperature thereof to its saturation value, passing said liquid into a second compression zone and thence into a second heating zone to raise the pressure and temperature to values above the critical point, introducing the liquid into an expansion zone to change the liquid to a wet vapor, passing said wet vapor to a separator to remove moisture therefrom and to a third heating zone, introducing the vapor into a second expansion zone to further reduce the pressure of said vapor, and condensing said vapor to a liquid state.

6. A power generation plant comprising means for compressing a liquid to a sub-critical pressure, means for heating said sub-critical pressure liquid to the saturation temperature, means for compressing said liquid to a pressure above critical, means for heating said above critical pressure liquid to a temperature above the critical point, driving means connected to receive liquid from said second heating means and operable by said above critical pressure liquid, said driving means expanding the liquid and changing the latter to a wet vapor containing impurities, power consuming means operable by said driving means, means for separating the moisture and impurities from said vapor to provide a clean vapor, and power output means operable by said clean vapor.

7. A power generation plant comprising means for heating a sub-critical pressure liquid to the saturated temperature, a pump receiving said liquid and increasing the pressure thereof above the critical pressure, means for heating said liquid to a temperature above the critical point, a liquid turbine communicating with said second mentioned heating means and operable by the liquid therefrom, said turbine reducing the pressure of said liquid to change the latter to a wet vapor containing impurities, power output means operated by said turbine, means for separating the moisture and impurities from said vapor to change it to a clean vapor, and a vapor turbine operated by said clean vapor.

8. A power generation plant comprising an over-critical pressure stage and a sub-critical stage, means in said over-critical pressure stage for raising the pressure of a saturated liquid to above critical pressure, means for heating said above critical pressure liquid to raise the temperature thereof above the critical point, power output means operated by the above critical liquid to provide a net power output in said over-critical pressure stage, said power output means decreasing the pressure of said above critical liquid to change the latter to a wet vapor containing impurities, means in said sub-critical pressure stage for cleaning said wet vapor to remove moisture and impurities therefrom, and second power output means in said sub-critical pressure stage operated by the clean vapor to provide a power output in said sub-critical pressure stage.

9. A power generation plant comprising an over-critical pressure stage and a sub-critical pressure stage, means in said over-critical pressure stage for raising the pressure of a saturated liquid from said sub-critical pressure stage to above critical pressure, means for heating said above critical liquid to a temperature above the critical point, power output means operated by the above critical liquid to provide a net power output in said over-critical pressure stage, said power output means decreasing the pressure of said above critical liquid to change the latter to a wet vapor and to concentrate the impurities from the liquid into moisture of said vapor, means for separating the impurities and moisture from said vapor to provide a substantially clean vapor, means in said sub-critical pressure stage for receiving and heating said clean vapor, and second power output means operated by said clean vapor to provide a power output in said sub-critical pressure stage.

10. A power generation plant comprising an over-critical pressure stage and a sub-critical pressure stage, a vapor vessel having a saturated liquid therein, said vapor vessel having a liquid outlet and a vapor inlet and outlet, means communicating with said liquid outlet for receiving liquid therefrom and for raising the pressure of the liquid to above critical pressure, means for heating said above critical liquid to a temperature above the critical point, power output means operated by the liquid above the critical point to provide a net power output in said over-critical pressure stage, said power output means decreasing the pressure of said above critical liquid to change the latter to a wet vapor and to precipitate impurities from said liquid, means for conducting the vapor and impurities to the vapor inlet of said vessel, a separator arranged in said vessel and in the path of flow of said vapor from the vapor inlet to the vapor outlet for separating the moisture and impurities from said vapor to provide a clean vapor, heating means for receiving and heating said clean vapor, and second power output means in said sub-critical pressure stage operated by said heated vapor to provide a power output in said sub-critical pressure stage.

11. A power generation plant comprising an over-critical pressure stage and a sub-critical pressure stage, a vapor vessel having a saturated liquid therein, said vapor vessel having a liquid outlet and a vapor inlet and outlet, means communicating with said liquid outlet for receiving liquid therefrom and for raising the pressure of the liquid to above critical pressure, heating means comprising heated tubular means for receiving and heating liquid from said pressure raising means, conduit means communicating with said tubular means receiving liquid therefrom, power output means communicating with said conduit means and operated by the liquid to provide a net power output in said over-critical pressure stage, said power output means decreasing the pressure of said above critical liquid to change the latter to a wet vapor, means for separating the moisture from said wet vapor, means for delivering said vapor to the vapor inlet of said vessel, control means for said conduit means for controlling the flow of liquid from said tubular means to said power output means to maintain the pressure of the liquid in said tubular means above the critical pressure, means in said sub-critical pressure stage in communication with the vapor outlet of said vessel for receiving and heating said vapor, and second power output means in said sub-critical pressure stage operated by said heated vapor to provide a power output in said sub-critical pressure stage.

12. A power generation plant comprising an over-critical pressure stage and a sub-critical pressure stage, means in said over-critical pressure stage for raising the pressure of a saturated liquid to above critical pressure, means for heating said liquid at said pressure to a temperature above the critical point, a plurality of liquid turbines connected to receive and being operable by said above critical pressure liquid, said liquid turbines decreasing the pressure of said above critical liquid to change the latter to a wet vapor and to precipitate impurities from the liquid, one of said liquid turbines being connected for operating said pressure raising means, adjustable means for proportioning the flow of above critical liquid to said liquid turbines, means for separating the impurities from the vapor to provide a substantially clean vapor, means in said sub-critical pressure stage for receiving and heating said clean vapor, a multi-stage vapor operated turbine in said sub-critical pressure stage connected to receive and being operable by the vapor from the last-mentioned heating means, means drivably connected to another liquid turbine and being operable thereby, said last-mentioned means being connected to receive exhaust vapor from a stage of the multi-stage turbine and raising the pressure of said exhaust vapor, means for reheating the pressurized exhaust vapor, and means for feeding the reheated exhaust vapor to a second stage of the multi-stage turbine.

13. A power generation plant comprising an over-critical pressure stage and a sub-critical pressure stage, a vessel having a saturated liquid therein, said vessel having a liquid inlet and outlet and a vapor inlet and outlet, means communicating with said liquid outlet for receiving and raising the pressure of said saturated liquid to above the critical pressure, heating means comprising tubular means for receiving and heating liquid from said pressure raising means to above the critical point, conduit means communicating with said tubular means and receiving liquid therefrom, a liquid turbine communicating with said conduit means and operable by said above critical pressure liquid, said turbine being connected for operating the pressure raising means and exhausting the liquid to a pressure at which the latter changes to a wet vapor to precipitate impurities from the liquid, means communicating the exhaust of the turbine with the vapor inlet of the vessel to conduct vapor thereto, means for separating impurities from the vapor in the vapor generator so that a substantially clean vapor passes from the vapor outlet, means in communication with the vapor outlet for heating the clean vapor, a second liquid turbine in said sub-critical pressure stage in communication with said conduit means for receiving liqud therefrom and operable thereby, said second liquid turbine decreasing the pressure of the liquid exhausted therefrom so as to change it to a wet vapor, means for delivering the wet vapor from said second liquid turbine to said vapor inlet of the vessel, a control valve for said conduit means and operable for proportioning the liquid from said tubular means to both said first and second liquid turbines, a multi-stage vapor operated turbine in said sub-critical pressure stage connected to receive vapor from the vapor heating means, means operable by said second liquid turbine and connected to receive exhaust vapor from an intermediate stage of the multi-stage turbine, the last-mentioned operable means raising the pressure of said exhaust vapor, means for reheating said exhaust vapor, conduit means for delivering the reheated exhaust vapor to the next stage of the multi-stage turbine, and means for changing the exhaust vapor from the last stage of the multi-stage turbine to a liquid and for delivering the latter to the liquid inlet of said vessel.

14. The power generation plant of claim 13 wherein control valves are associated with and arranged in inlets of said liquid turbines, said control valves being responsive to the speed of their associated turbines for diverting the flow of liquid from said turbines to the vessel when the speed of said turbines exceeds a predetermined value.

15. The power generation plant of claim 13 wherein a minimum pressure valve is arranged in the conduit means communicating with both said turbines in said above critical pressure stage, said valve regulating the flow of liquid to said turbines to maintain the pressure of liquid in said tubular means above critical pressure.

16. A power generation plant comprising an over critical pressure stage and a sub-critical pressure stage, a vessel having a saturated liquid therein, said vessel having a liquid outlet and a vapor inlet and outlet, means in communication with the liquid outlet of the vessel for receiving and raising the pressure of the liquid to above the critical pressure, means for heating the liquid to above the critical point, a liquid turbine communicating with said heating means operable by the above critical liquid and connected for operating said pressure raising means, said liquid turbine reducing the pressure of the liquid at the outlet thereof to change the liquid to a wet vapor containing impurities, means for delivering the wet vapor from the outlet of said liquid turbine to the vapor inlet of said vessel, means in said vessel for separating the moisture and impurities from said vapor to provide a clean vapor, a superheater in communication with the vapor outlet of said vessel for superheating the clean vapor, a vapor operated turbine having an inlet in communication with the superheater and operable by the vapor from the latter, an electrical generator operable by said vapor turbine, a second liquid turbine in said over-critical pressure stage operable by said above critical liquid, a second electrical generator operable by said second liquid turbine to provide an electrical output, control means operable for controlling the proportion of flow of above critical liquid to both said liquid turbines in accordance with the load on said second liquid turbine, and means associated with said vapor turbine and operable for controlling the flow of vapor to said turbine in accordance with changes in electrical load on said first-mentioned electrical generator.

17. Power generation apparatus of claim 16 wherein the operable means associated with the vapor turbine comprises a valve responsive to the speed of said turbine to provide greater flow of vapor to the turbine with an increase in electrical load on said first-mentioned electrical generator and providing lesser flow of vapor to the vapor turbine with a decrease in electrical load on said first-mentioned electrical generator.

18. A power generation plant comprising an over-critical pressure stage and a sub-critical pressure stage, means in said over-critical pressure stage for raising the pressure of a saturated liquid to above critical pressure, means for heating said liquid to a temperature above the critical point, a plurality of liquid turbines connected to receive and operated by said above critical pressure liquid, said liquid turbines decreasing the pressure of said above critical liquid to change the latter to a wet vapor and to precipitate impurities from the liquid, one of said liquid turbines being connected for operating the pressure raising means, means for separating the impurities and moisture from the wet vapor to provide a substantially clean vapor, a vapor operated turbine in said sub-critical pressure stage connected to receive and operated by the clean vapor, an electrical generator operable by said vapor operated turbine, means controlling the flow of clean vapor to said vapor operated turbine to maintain the speed of the latter constant with changes in electrical load on said electrical generator, power output means in said over-critical pressure stage operable by another of said liquid turbines, and adjustable means for controlling the flow of above critical liquid to both of said mentioned liquid turbines, said adjustable means being operable for operating both said liquid turbines at variable speeds with variations in electrical load of the sub-critical pressure stage.

19. Power generation apparatus comprising an over-critical pressure stage and a sub-critical pressure stage, a variable speed motor, a pump in said over-critical pressure stage and having an outlet, and an inlet for receiving saturated liquid and being operable by said motor to raise the pressure of said liquid to above critical pressure, means communicating with said pump outlet for receiving and heating the liquid to bring the latter above the critical point, a liquid turbine in said over-critical pressure stage for receiving liquid from said heating means and operable by the liquid flow, said liquid turbine exhausting the liquid at below critical pressure and changing the liquid to a wet vapor containing impurities, means for separating the moisture and impurities from said wet vapor to provide a clean vapor, an electrical generator operable by said liquid turbine, the variable speed motor varying the speed of the pump so as to vary the pressure of the liquid in said heating means with changes in electrical load on said electrical generator, a superheater in said sub-critical pressure stage connected to receive said clean vapor, a vapor operated turbine in said sub-critical pressure stage connected to receive and operated by the vapor from the superheater, and a second electrical generator connected for operation by said vapor turbine.

20. A power generation plant comprising an over-critical pressure stage and a sub-critical pressure stage, a vessel having a saturated liquid therein, said vessel having a liquid inlet and outlet and a vapor inlet and outlet, means in said over-critical pressure stage for raising the pressure of the saturated liquid therein to above critical pressure, means for heating said above-critical pressure liquid and raising the temperature above the critical point, a plurality of liquid turbines communicating with said heating means and operable by the liquid from the latter, said turbines being constructed and arranged to provide for expansion of said liquid at the outlet thereof to thereby change the liquid to a wet vapor containing impurities at below the critical point, one of said liquid turbines being connected for operating the pressure raising means, means for delivering the wet vapor to the vapor inlet of said vessel, means in said vessel for separating moisture and impurities from wet vapor to provide a substantially clean vapor, means for receiving and superheating said vapor, a multi-stage vapor operated turbine in the sub-critical pressure stage and having a stage connected to receive vapor from the superheating means, means for condensing exhaust vapor from another stage of the multi-stage turbine, means communicating said condensing means with the liquid inlet of said vessel for conducting condensate thereto, a compressor operable by another of said liquid turbines and receiving and compressing the vapor from the first-mentioned stage of said multi-stage vapor operated turbine, and means conducting said compressed vapor in heat exchange relationship with the condensate to said vessel.

21. A power generation plant comprising an over-critical pressure stage and a sub-critical pressure stage, a liquid and vapor vessel containing a saturated liquid therein, said vessel having a liquid inlet and outlet and a vapor inlet and outlet, means in said over critical pressure stage for raising the pressure of the saturated liquid therein to above critical pressure, means for heating said above critical pressure liquid and raising the temperature above the critical point, a liquid turbine communicating with said heating means and operable by the liquid therefrom, said liquid turbine being constructed and arranged to provide for expansion of said liquid at the outlet thereof to thereby change the liquid to a wet vapor containing impurities at below the critical point, means for delivering the wet vapor to the vapor inlet of said vessel, means for separating moisture and impurities from said wet vapor to provide a substantially clean vapor, means for receiving and superheating said vapor, a vapor operated turbine in the sub-critical pressure stage connected to receive vapor from the superheating means, feed liquid delivery means for conducting feed liquid to said liquid and vapor vessel, means for passing a portion of the vapor from the vapor operated turbine in heat exchange relationship with said feed liquid delivery means, a multi-stage compressor operable by said liquid turbine and having a first stage connected to receive and compress another portion of the vapor from the vapor operated turbine, means for desuperheating the compressed vapor portion from a first stage of the compressor by passing it in heat exchange relationship with the feed liquid, a second stage of said multi-stage compressor connected to receive the desuperheated compressed vapor and for further compressing the latter, and means connected to receive the compressed desuperheated vapor from the second stage of the multi-stage compressor and for passing the last-mentioned vapor in heat exchange relationship with the feed liquid delivered to the liquid and vapor vessel.

22. A power generation plant comprising an over-critical pressure stage and a sub-critical pressure stage, a vessel having a saturated liquid therein, said vessel having a liquid inlet and outlet and a vapor inlet and outlet, means in said over-critical pressure stage for raising the pressure of the saturated liquid therein to above the critical pressure, means for heating said above critical pressure liquid and raising the temperature thereof to a value above the critical point, a plurality of liquid turbines communicating with said heating means and operable by said liquid, said turbines being constructed and arranged to provide for expansion of said liquid at the outlet thereof to change the liquid to a state of wet vapor containing impurities at below the critical point, one of said liquid turbines being connected for operating said pressure raising means, means for delivering the wet vapor to the vapor inlet of said vessel, means in said sub-critical pressure stage for separating moisture and impurities from said wet vapor to provide a substantially clean vapor, means for receiving and superheating said clean vapor, a multi-stage vapor operated turbine in the sub-critical pressure stage receiving and being operable by the vapor from the superheating means, a pair of series connected heat exchangers having tubular means in communication with each other, the tubular means of one of said pair of heat exchangers being connected to receive the condensed vapor, in liquid state, from said multi-stage turbine while the tubular means of the other heat exchanger communicates with the liquid inlet of the vessel, a multi-stage compressor operable by another of said liquid turbines and having a first stage connected to receive a part of exhaust vapor from a stage of said vapor operated turbine for compressing the vapor, means for conducting the compressed vapor to said one heat exchanger in heat exchange relationship with the liquid passing through the tubular means of the last-mentioned heat exchanger whereby said compressed vapor becomes desuperheated, a second stage of said compressor communicating with an outlet of said one heat exchanger to receive and compress further the desuperheated vapor therefrom, and means for delivering the compressed and desuperheated vapor from said second compressor stage to said other heat exchanger and in heat exchange relationship with the liquid flowing through the tubular means of said other heat exchanger.

23. A power generation plant comprising an over-critical pressure stage and a sub-critical pressure stage, a vessel having a saturated liquid therein, means in said over-critical pressure stage for raising the pressure of the saturated liquid to above critical pressure, means for heating said above critical pressure liquid and raising the temperature above the critical point, a plurality of liquid turbines communicating with said heating means and operable by said liquid, said turbines being constructed and arranged to provide for expansion of said liquid at the outlet thereof to thereby change the liquid to a wet vapor containing impurities at below the critical point, one of said liquid turbines being connected for operating the pressure raising means, means for delivering the wet vapor to said vessel, means in said vessel for separating moisture and impurities from the wet vapor to provide a substantially clean vapor, means for receiving and superheating said clean vapor, a multi-stage vapor operated turbine in the sub-critical pressure stage having a stage connected to receive vapor from the superheating means, means communicating with the outlet of said mentioned stage of said multi-stage vapor operated turbine for desuperheating vapor flowing from said outlet, a multi-stage compressor operable by another of said liquid turbines and having a stage connected to receive and compress said desuperheated vapor, second desuperheating means connected for receiving said compressed and desuperheated vapor and further desuperheating the latter, a second stage of said compressor communicating with said second desuperheating means for compressing the desuperheated vapor therefrom, means for condensing exhaust vapor from another stage of said multi-stage vapor operated turbine, and means communicating with said second compressor stage for passing the desuperheated and compressed vapor therefrom in heat exchange relationship with said condensed exhaust vapor from said last-mentioned stage of said multi-stage vapor operated turbine.

24. The power generation plant of claim 23 wherein the last-mentioned means causes total condensation of the desuperheated and compressed vapor from the second stage of the compressor, and wherein conduit means communicate with said last-mentioned means and with both stages of the compressor to provide the latter with part of the condensate from the last-mentioned means.

25. A power generation plant comprising an over-critical pressure stage and a sub-critical pressure stage, means in said over-critical pressure stage for raising the pressure of saturated liquid to above critical pressure, means for heating said liquid at said pressure to a temperature above the critical point, a liquid turbine connected to receive and being operable by said above-critical pressure liquid, said liquid turbine decreasing the pressure of said over-critical liquid to change the latter to a wet vapor and to precipitate impurities from the liquid, said liquid turbine further being connected for operating the pressure raising means in said over-critical pressure stage, means for separating the impurities from said wet vapor to provide substantially clean vapor, means for receiving and superheating the clean vapor, a multi-stage vapor operated turbine, means communicating the superheating means with a first stage of the vapor operated turbine to operate the latter, a second liquid turbine operable by the above critical pressure liquid, a compressor connected for operation by said second liquid turbine, a desuperheater communicating with the first stage of said vapor operated turbine and with the compressor to provide the latter with cooled vapor from the vapor turbine, a reheater surface communicating with the compressor and with a second stage of the vapor operated turbine for reheating the compressed vapor and conducting the latter in a reheated state to said second stage of the vapor turbine, and means communicating with the second stage of the vapor turbine for condensing vapor exhausted therefrom.

26. Power generation apparatus comprising a vapor generator having a setting, a drum in said setting having liquid and vapor spaces and an inlet and an outlet for each of said spaces, a plurality of combustion chambers in said setting, firing means for each of said combustion chambers and operating independently of each other, means for conducting a feed liquid into said drum through said liquid inlet, a pump having an outlet, and an inlet communicating with said drum for raising the pressure of the saturated liquid from the drum to above critical pressure, liquid conducting means in one of said combustion chambers communicating with the pump outlet and conducting the pressurized liquid in heat exchange relationship with the gases of combustion in said one combustion chamber, the firing means of said one combustion chamber being operable for increasing the temperature of the pressurized liquid above the critical point, means communicating with said liquid conducting means for decreasing the pressure of the above critical pressure liquid, by making it do work, to below the critical point to change the latter to a wet vapor and to precipitate impurities from the liquid, means conducting said wet vapor to the vapor inlet of said drum, means in said drum for separating the impurities from said wet vapor to provide passage of substantially clean vapor from the vapor outlet of said drum, vapor conducting means in a second combustion chamber communicating with the vapor outlet of said drum and conducting the clean vapor in heat exchange relationship with the gases of combustion in said second combustion chamber, the firing means of said second combustion chamber being operable for superheating the clean vapor, vapor operated means communicating with said vapor conducting means and operable by the latter, said vapor operating means exhausting the vapor at a decreased temperature, vapor conducting means in a third combustion chamber for receiving the exhaust vapor, said last-mentioned vapor conducting means being arranged in said third combustion chamber to pass the exhaust vapor in heat exchange relationship with gases of combustion in said combustion chamber to reheat the vapor, and means communicating said last-mentioned vapor conducting means with the vapor operated means to conduct the reheated vapor thereto.

27. The power generation apparatus of claim 26 wherein a convection chamber is arranged in the setting and in communication with all of said combustion chambers to receive gases of combustion therefrom, and liquid conducting means in said convection chamber in communication with said pump and the liquid conducting means of said first combustion chamber for conducting the above critical pressure liquid in heat exchange relationship with the gases of combustion from all of said combustion chambers.

28. A power generation plant comprising means for heating a sub-critical pressure liquid to a saturated temperature, means for receiving said liquid and increasing the pressure thereof above critical pressure, means for heating said above critical liquid to a predetermined temperature, driving means connected to receive and operable by said above critical pressure liquid, said driving means being connected for operating the second-mentioned means, the liquid being discharged from the driving means as a vapor, means for regulating the operation of said driving means to maintain the temperature of the above critical pressure liquid flowing to the latter at said predetermined temperature, power output means connected for operation by the above critical pressure liquid from the second-mentioned heating means, means responsive to the pressure of the above critical pressure liquid operating both said driving means and said power output means for regulating the operation of said power output means, the above critical liquid being exhausted from said power output means as a vapor at said sub-critical pressure, means for collecting said vapor from said driving means and said power output means, means for superheating said vapor, and second power output means communicating with said superheating means and operable by the superheated vapor.

29. The power generation plant of claim 28 wherein the regulating means is responsive to the temperature of the above critical pressure liquid received by the driving means to control operation of the latter.

30. A power generation plant comprising means for heating a sub-critical pressure liquid to a saturated temperature, means for receiving said liquid and increasing the pressure thereof above critical pressure, means for heating said above critical liquid to a predetermined temperature, driving means connected to receive and operated by said above critical pressure liquid, said driving means being connected for operating the second-mentioned means, the liquid being discharged from the driving means as a vapor at said sub-critical pressure, means operable in response to the temperature of said above critical pressure liquid to said driving means for controlling the flow of said liquid to said driving means to maintain the temperature of the liquid to said driving means at said predetermined temperature, power output means connected for operation by the above critical pressure liquid from the second heating means, means responsive to the pressure of the above critical pressure liquid operating both said driving means and the power output means for regulating the operation of said power output means, the above critical pressure liquid being discharged from said power output means as a vapor at said sub-critical pressure, means for collecting said vapor from said driving means and said power output means, means for superheating said vapor, and second power output means communicating with the superheating means and operable by the superheated vapor.

31. The power generation plant of claim 30 wherein said driving means is connected to receive the above critical pressure liquid and the pressure responsive means controls flow of the above critical pressure liquid to said first-mentioned power output means.

32. A power generation plant comprising a sub-critical pressure stage and an above-critical pressure stage, a furnace, firing means for said furnace to provide combustion gases therein, means in said sub-critical pressure stage for heating a sub-critical liquid to a saturated temperature, a vapor and liquid vessel, a superheater connected to receive vapor from the vapor and liquid vessel and superheating said vapor, power output means in said sub-critical stage operable by said vapor to provide a desired output at a full load condition, means responsive to the pressure of the superheated vapor for controlling the firing rate of said firing means to maintain the pressure of said vapor at a predetermined value, means in said above critical stage connected to receive the sub-critical pressure liquid at the saturated temperature and raising the pressure of the latter to above critical, means subjected to the heat of said combustion gases and connected for heating said above critical pressure liquid to a predetermined temperature, driving means connected to receive and operated by said above critical pressure liquid, said driving means being connected for operating the pressure raising means, the liquid being discharged from the driving means as a vapor at sub-critical pressure, control means operable upon change in firing rate of said firing means for controlling the flow of above critical pressure liquid to said driving means to thereby control the operation thereof, second power output means connected for operation by the above critical pressure liquid from the above critical liquid heating means, means responsive to the pressure of the above critical pressure liquid operating both said driving means and said second power output means for regulating the operation of said second power output means, the above critical liquid being discharged from said second power output means as a vapor at said sub-critical pressure, and means for conducting said vapor from said driving means and said second power output means to said vapor-liquid vessel.

33. A power generation plant comprising means for heating a sub-critical pressure liquid to a saturated temperature, means for receiving said liquid and increasing the pressure thereof above critical pressure, means for heating said above critical pressure liquid to a predetermined temperature, driving means connected to receive and operable by said above critical pressure liquid, said driving means being connected for operating the pressure raising means, the liquid being discharged from the driving means as a vapor at sub-critical pressure, means responsive to the temperature of the above critical pressure liquid received by said driving means for regulating the operation thereof, power output means including a second driving means connected for operation by the above critical pressure liquid from the second heating means, means responsive to the pressure of the above critical liquid operating both said first and said second driving means for regulating the operation of said second driving means, the above critical liquid being discharged from said second driving means as a vapor at said sub-critical pressure, means for collecting said vapor from said first and said second driving means, means for superheating said vapor, a multi-stage turbine having at least two stages, a first stage of said turbine being connected to receive and operated by the superheated vapor, a compressor communicating with the turbine first stage for receiving and compressing exhaust vapor from the latter, means for reheating compressed vapor from the compressor, and a second stage of said multi-stage turbine communicating with said last-mentioned means for receiving the reheated vapor.

34. The power generation plant of claim 33 wherein desuperheating means are provided between the turbine first stage and the compressor to provide for desuperheating of the exhaust vapor before compression by the compressor.

35. A power generation plant comprising means for heating a sub-critical pressure liquid to a saturated temperature, a pump receiving said liquid and increasing the pressure thereof above critical pressure, means for heating said above critical pressure liquid to a predetermined temperature, a first liquid turbine connected to receive and operable by said above critical pressure liquid, said turbine being connected for operating the pump, the liquid being discharged from the turbine as a vapor at said sub-critical pressure, means operable in response to the temperature of said above critical pressure liquid to said first liquid turbine for controlling the flow of said liquid to said turbine to maintain the temperature of the liquid thereto at said predetermined temperature, a second liquid turbine connected for operation by the above critical pressure liquid from the second heating means, means responsive to the pressure of the above critical pressure liquid operating both said pump and said first liquid turbine for regulating the operation of said second liquid turbine, the above critical liquid being exhausted from said second liquid turbine as a vapor at said sub-critical pressure, means for collecting said vapor from said first and said second liquid turbine, means for superheating said vapor, and a vapor turbine communicating with said last-mentioned means and operated by the superheated vapor.

36. The method of starting up a power generation plant which comprises a vapor turbine and a pair of liquid turbines, the steps comprising, pressurizing a liquid to a predetermined value above critical, heating the liquid to a predetermined temperature, reducing the pressure of the heated liquid to change it to a vapor at below critical pressure, conducting the vapor to a vapor turbine to operate the latter, conducting a portion of the heated above-critical liquid without reducing the pressure thereof to both liquid turbines after the vapor turbine operates at a predetermined load to provide for preheating of said liquid turbines, thereafter passing all of the heated above-critical liquid to both said liquid turbines where the liquid is discharged as a vapor below critical pressure, and conducting the vapor to the vapor turbine to operate the latter.

37. The method of starting up a power generation plant which comprises a vapor turbine and a pair of liquid turbines, the steps comprising, pressurizing a liquid to a predetermined value above critical, heating the liquid to a predetermined pressure, reducing the pressure of the heated liquid to change it to a vapor at below critical pressure, conducting the vapor to the vapor turbine to operate the latter, conducting a portion of the heated above critical liquid, without reducing the pressure thereof, to both liquid turbines after the vapor turbine operates at a predetermined load to provide for preheating of said liquid turbines, thereafter passing all of the heated above critical liquid, without reducing the pressure thereof, to both said liquid turbines where part of the liquid is discharged as a wet vapor containing impurities below critical pressure, separating the vapor from the discharged liquid, removing moisture and impurities from said vapor to provide substantially clean vapor, and conducting the clean vapor to the vapor turbine to operate the latter.

38. The method of starting up a power generation plant which comprises a vapor turbine and a pair of liquid turbines, the steps comprising, pressurizing a liquid to a predetermined value above critical, heating the liquid to a predetermined temperature, reducing the pressure of the heated liquid to change it to a vapor at below critical pressure, conducting the vapor to the vapor turbine to operate the latter, conducting a portion of the heated above critical liquid, without reducing the pressure thereof, to both liquid turbines after the vapor turbine operates at a predetermined load to provide for preheating of said liquid turbines, thereafter conducting a portion of the above critical liquid without changing the pressure thereof through one of said liquid turbines until the temperature and pressure of the liquid flowing thereto attain predetermined values, further increasing the pressure of the above critical liquid, conducting all of the above critical liquid to both said liquid turbines where the liquid from each turbine is discharged as a vapor below critical pressure, and conducting the vapor to the vapor turbine to operate the latter.

39. The method of starting up a power generation plant which comprises a vapor and liquid vessel, a vapor turbine, and a pair of liquid turbines, the steps comprising, passing liquid at sub-critical pressure to the vessel, causing liquid to flow from said vesssel, raising the pressure of the liquid from said vessel to a predetermined value above critical, heating the liquid conducted from the vessel to a predetermined temperature, reducing the pressure of the above critical and heated liquid and returning the latter to the vessel as a vapor below critical pressure, passing the vapor to the vapor turbine to operate the latter until it is operating at a predetermined load, thereafter bypassing a portion of the above critical and heated liquid, without reducing the pressure thereof, to the pair of liquid turbines to provide for preheating of the turbines, flowing a larger quantity of above critical liquid to both liquid turbines after preheating thereof, thereafter conducting all of the above critical liquid at a pressure above the mentioned above critical pressure value to both said liquid turbines where the liquid is discharged as a vapor, and conducting the vapor to the vapor turbine to operate the latter.

40. The method of starting up a power generation plant which comprises a vapor and liquid vessel, a vapor turbine, and a pair of liquid turbines, the steps comprising, passing liquid at sub-critical pressure to the vessel, causing liquid to flow from said vessel, raising the pressure of the liquid from said vessel to a predetermined value above critical, heating the liquid conducted from the vessel to a predetermined temperature, reducing the pressure of the above critical and heated liquid and returning the latter to the vessel as a vapor below critical pressure, passing the vapor to the vapor turbine to operate the latter until it is operating at a predetermined load, conducting a portion of the above critical liquid, without reducing the pressure thereof, through one of said liquid turbines until the temperature and pressure of the liquid flowing therethrough attain predetermined values, further increasing the pressure of the above critical liquid, conducting all of the above critical liquid to both liquid turbines where the liquid from each turbine is discharged as a vapor below critical pressure, and conducting the vapor to the vapor turbine to operate the latter.

41. In a power generation plant, a vessel connected to receive liquid at a sub-critical pressure, pressure raising means connected to receive said sub-critical pressure liquid from said vessel to raise the pressure thereof to a predetermined value above critical, means for heating the last-mentioned liquid, pressure reducing means connected to receive said heated liquid and reducing the pressure thereof to below critical to change the liquid to a wet vapor containing impurities, conduit means communicating with the last-mentioned means and with said vessel to conduct vapor to the latter, means in said vessel for removing moisture and impurities from said vapor to provide a substantially clean vapor, a vapor turbine communicating with said vessel to receive and operated by the clean vapor, said pressure raising means communicating with said heating means to provide the latter with above critical pressure liquid, driving means connected for receiving the above critical liquid from the heating means and operable thereby, said driving means being connected for operating said pressure raising means, power output means connected to receive above critical liquid from the heating means and operable thereby, means for cutting off flow of liquid to the pressure reducing means and diverting flow of said liquid to both the driving means and the power output means, the liquid being discharged from said driving means and said power output means as a mixture of vapor and liquid, means connected to both said driving means and said power output means for receiving the mixture of vapor and liquid and for separating the latter, and means communicating with the last-mentioned means and said vessel for returning the separated vapor and liquid in separate flow paths to said vessel.

42. The power generation plant of claim 41 wherein the driving means comprises a liquid turbine and the power output means comprises a second liquid turbine, and wherein control means responsive to the temperature of the liquid to the first-mentioned turbine regulates the flow of liquid thereto, and further, wherein second control means responsive to the pressure of the liquid to the first-mentioned liquid turbine controls the flow of liquid to said second liquid turbine.

43. In a power generation plant, a vessel connected to receive liquid at a sub-critical pressure, pressure raising means connected to receive said sub-critical pressure liquid from said vessel to raise the pressure thereof to a predetermined value above critical, means for heating the last-mentioned liquid, conduit means communicating said heating means with said vessel, valve means for said conduit means and operable upon the liquid attaining said predetermined pressure in said conduit means for allowing flow of liquid therethrough, pressure reducing means in said conduit means for causing the heated liquid to change to a wet vapor containing impurities at below critical pressure and to enter the vessel in such state, means in said vessel for removing moisture and impurities from said vapor to provide a substantially clean vapor, a vapor turbine communicating with said vessel for receiving and being operated by the clean vapor, said pressure raising means communicating with said heating means to provide the latter with above critical pressure liquid, driving means connected for receiving above critical liquid from the heating means and operable thereby, said driving means being connected for operating said pressure raising means, power output means connected to receive above critical liquid from the heating means and operable thereby, second valve means in the first-mentioned conduit means for cutting off flow of liquid to the pressure reducing means and diverting flow of said liquid to both said driving means and said power output means, the liquid being discharged from said driving means and said power output means as a mixture of vapor and liquid, means connected to both said driving means and said power output means for receiving the mixture of vapor and liquid and for separating the latter, and means communicating with the last-mentioned means and said vessel for returning the separated vapor and liquid in separate flow paths to said vessel.

44. In a power generation plant, a vapor and liquid vessel connected to receive liquid at a sub-critical pressure, a pump connected to receive said sub-critical pressure liquid from said vessel to raise the pressure thereof to a predetermined value above critical, a heat exchanger connected for receiving and heating said above critical liquid, conduit means communicating at one end with said heat exchanger and at the other end communicating with said vessel, valve means in said conduit means for preventing flow of the heated above critical pressure liquid to said vessel below said predetermined pressure value, flash orifices in said conduit means for causing the heated liquid to change to a vapor, diffuses in said conduit means for reducing the pressure of the vapor to below critical value to provide entry of wet vapor containing impurities to the vessel, means in said vessel for removing moisture and impurities from said vapor to provide a substantially clean vapor, a vapor turbine connected to receive and operated by the clean vapor, a first liquid turbine communicating with said heat exchanger and operated by heated above critical liquid therefrom, said pump being operable by said first liquid turbine and having an intake connected to receive liquid from the vessel and an outlet connected to the heat exchanger, a second liquid turbine communicating with said heat exchanger and operable by heated above critical liquid therefrom, the liquid being discharged from outlets of both said turbines as a mixture of liquid and vapor at below critical pressure, a separator connected to the outlets of each liquid turbine for separating liquid from the vapor, conduit means in communication with said separators and with said vessel for conducting separated vapor to the latter, a sump connected to said separators and receiving and collecting the separated liquid, and means communicating with said sump and said vessel for conducting the separated liquid to the latter.

45. The method of producing a power cycle of high efficiency by separating the power cycle into two parallel pressure stages, a sub-critical pressure stage and an over-critical pressure stage, the steps comprising compressing a liquid to a sub-critical pressure, heating the liquid to the saturation temperature, raising the pressure and temperature of said liquid to values above the critical point, decreasing the pressure of said liquid, by making it do work, to said sub-critical pressure to change the liquid to a vapor, collecting said vapor, expanding the collected vapor by making it do work, and condensing the vapor to a liquid state.

46. The method of producing a power cycle of high efficiency by separating the power cycle into two parallel pressure stages, a sub-critical pressure stage and an over-critical pressure stage, the steps comprising compressing a liquid to a sub-critical pressure, heating the liquid to the saturation temperature, raising the pressure and temperature of said liquid to values above the critical point, decreasing the pressure of said liquid, by making it do work, to said sub-critical pressure to change the liquid to a vapor, collecting and superheating said vapor, expanding said superheated vapor by making it do work, whereby the pressure and temperature of the vapor are further reduced, and condensing the vapor to a liquid state.

47. The method of producing a power cycle of high efficiency by separating the power cycle into two parallel pressure stages, a sub-critical pressure stage and an over-critical pressure stage, the steps comprising compressing the liquid to a sub-critical pressure, heating said liquid to the saturation temperature, raising the pressure and temperature of said liquid to values above the critical point, decreasing the pressure of said liquid, by making it do work, below the critical point and to a value to change the liquid to a vapor, collecting and superheating said vapor, expanding said superheated vapor by making it do work, whereby the pressure and temperature of the vapor are further reduced, reheating said vapor to raise the temperature thereof, expanding said reheated vapor by making it do work, and condensing said reheated and expanded vapor to a liquid state.

48. A power generation plant comprising means for compressing a liquid to a sub-critical pressure, means for heating said sub-critical pressure liquid to the saturation temperature, means for compressing said liquid to a pressure above the critical point, means for heating said above critical pressure liquid to a temperature above the critical point, driving means connected to receive liquid from said second heating means and operable by said above critical pressure liquid, said driving means expanding the liquid and changing the latter to a vapor, power consumption means operable by said driving means, means for collecting the vapor, and power output means operable by said vapor.

49. A power generation plant comprising an over-critical pressure stage and a sub-critical pressure stage, means in said over-critical pressure stage for raising the pressure of a saturated liquid to above critical pressure, means for heating said above critical pressure to raise the temperature thereof above the critical point, power output means operable by the above critical liquid to provide a net power output in said over-critical pressure stage, said power output means decreasing the pressure of said above critical liquid to change the latter to a vapor, means in said sub-critical pressure stage for collecting said vapor, and second power output means in said sub-critical pressure stage operable by the vapor to provide a power output in said sub-critical pressure stage.

50. The method of producing a power cycle of high efficiency, the steps comprising, compressing a liquid to a sub-critical pressure, heating the liquid at said sub-critical pressure, raising the pressure and temperature of said liquid to values above the critical point, decreasing the pressure of said liquid by making it do work to said sub-critical pressure to change the liquid to a superheated vapor, passing the superheated vapor in contact with the heated liquid at said sub-critical pressure to heat the liquid to saturation temperature whereby the vapor is cooled and a portion thereof is condensed, superheating the uncondensed portion of the cooled vapor, expanding the last-mentioned superheated vapor by making it do work, and condensing the expanded vapor to a liquid state.

51. The method of producing a power cycle of high efficiency, the steps comprising, compressing a liquid to a sub-critical pressure, heating the liquid at said sub-critical pressure, raising the pressure and temperature of said liquid to values above the critical point, decreasing the pressure of said liquid, by making it do work, to said sub-critical pressure to change the liquid to a superheated vapor, passing the superheated vapor in contact with the heated liquid at said sub-critical pressure to heat the liquid to saturation temperature whereby the vapor is cooled and a portion thereof is condensed, superheating the uncondensed portion of the cooled vapor, expanding the last-mentioned superheated vapor by making it do work, desuperheating the expanded vapor to reduce the volume thereof, compressing the desuperheated vapor, reheating the last-mentioned vapor, expanding the reheated vapor by making it do work, and condensing the expanded vapor to a liquid state.

52. A power generation plant comprising means for compressing a liquid to a sub-critical pressure, means for heating said liquid at said sub-critical pressure, means for raising the pressure and temperature of said liquid to values above the critical point, driving means connected to receive said above critical liquid and operable thereby, said driving means expanding the liquid and changing the latter to a superheated vapor, power consumption means operable by said driving means, means communicating with said driving means and said first-mentioned heating means for bringing the superheated vapor into heat exchange relationship with the liquid heated at sub-critical pressure to heat the liquid to saturation temperature whereby the vapor is cooled and a portion thereof is condensed, a superheater communicating with the last-mentioned means for receiving and superheating the uncondensed portion of the vapor, power output means connected to receive and operable by said superheated vapor, and means for condensing the vapor after passage through said power output means.

53. A power generation plant comprising means for compressing a liquid to a sub-critical pressure, means for heating said liquid at said sub-critical pressure, a vapor and liquid vessel, conduit means communicating the last-mentioned means with said vessel to provide the latter with said heated liquid, means communicating with said vessel for receiving said heated liquid and raising the pressure and temperature thereof to values above the critical point, driving means connected to receive said above critical liquid and operable thereby, said driving means expanding the liquid and changing the latter to a superheated vapor, power consumption means operable by said driving means, means communicating the driving means with said conduit means for bringing the superheated vapor into contact with said liquid heated at sub-critical pressure to heat the liquid to saturation temperature whereby the vapor is cooled and a portion thereof is condensed, a superheater communicating with the last-mentioned means for receiving and superheating the uncondensed portion of the vapor, a vapor operated turbine connected to receive said superheated vapor and operable thereby, and means for condensing the vapor discharged from the vapor turbine.

54. A power generation plant comprising a vapor and liquid drum containing a sub-critical pressure liquid at saturation temperature, means connected to receive said liquid for raising the pressure thereof to a value above the critical point, means communicating with the last-mentioned means for raising the temperature of the above critical liquid to a value above the critical point, a pair of liquid turbines communicating with the last-mentioned temperature raising means for receiving said liquid and operable thereby, said liquid turbines decreasing the pressure of the above critical liquid passing therethrough to change the liquid to a vapor, one of said liquid turbines being connected for operating the pressure raising means, a compressor connected for operation by the other of said liquid turbines, conduit means communicating said liquid turbines with the vapor and liquid drum to conduct the vapor to the latter, a superheater communicating with the vessel for receiving and superheating the vapor from the vessel, a multi-stage vapor operated turbine having a first stage connected to receive and operable by superheated vapor from the superheater, a desuperheater communicating with said first stage and with the compressor for receiving and desuperheating the vapor from the vapor turbine and for delivering the desuperheated vapor to the compressor for compression, a reheater connected to receive the compressed vapor from the compressor and reheating the vapor, a second stage of the vapor operated turbine connected to receive the reheated vapor, means for condensing vapor after passage through said second stage to a liquid, means for passing the condensed liquid into heat exchange relationship with the vapor in said desuperheater, and second conduit means communicating the desuperheater with the first-mentioned conduit means for passing the condensed liquid from the desuperheater into contact with the vapor in the conduit means to heat the condensed liquid to saturation temperature whereby the vapor is cooled and a portion thereof is condensed.

55. A power generation plant comprising an over-critical pressure stage and a sub-critical pressure stage, means in said over-critical pressure stage for raising the pressure and temperature of the saturated liquid to values above the critical point, a plurality of liquid turbines connected to receive and being operable by said above-critical pressure liquid, said liquid turbines decreasing the pressure of said above-critical liquid to change the latter to a vapor, one of said liquid turbines being connected for operating the pressure raising means, means for superheating the vapor, a vapor operated turbine for receiving the superheated vapor and operable thereby, said vapor turbine having a shaft, and another of said liquid turbines being drivably connected to the shaft of the vapor turbine for impressing its torque on the vapor turbine shaft.

References Cited in the file of this patent

UNITED STATES PATENTS

| | | |
|---|---|---|
| 1,632,575 | Abendroth | June 14, 1927 |
| 1,959,373 | Law et al. | May 22, 1934 |
| 2,192,759 | Stubbs | Mar. 5, 1940 |

FOREIGN PATENTS

| | | |
|---|---|---|
| 201,296 | Great Britain | Aug. 2, 1923 |
| 210,861 | Great Britain | Feb. 7, 1924 |
| 247,186 | Great Britain | Nov. 4, 1926 |
| 276,514 | Switzerland | Nov. 1, 1951 |

UNITED STATES PATENT OFFICE

CERTIFICATE OF CORRECTION

Patent No. 2,802,114                         August 6, 1957

Nicholas C. Artsay

It is hereby certified that error appears in the printed specification of the above numbered patent requiring correction and that the said Letters Patent should read as corrected below.

Column 15, line 29, for "operated" read -- operating --; column 20, line 23, for "liqud" read -- liquid --; column 25, line 43, after "critical" insert -- pressure --.

Signed and sealed this 26th day of November 1957.

(SEAL)

Attest:
KARL H. AXLINE

Attesting Officer

ROBERT C. WATSON
Commissioner of Patents